United States Patent
Wong et al.

(10) Patent No.: US 7,801,861 B2
(45) Date of Patent: Sep. 21, 2010

(54) TECHNIQUES FOR REPLICATING GROUPS OF DATABASE OBJECTS

(75) Inventors: Lik Wong, Union City, CA (US); Alan J. Demers, Boulder Creek, CA (US); James W. Stamos, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 276 days.

(21) Appl. No.: 11/366,300

(22) Filed: Mar. 1, 2006

(65) Prior Publication Data

US 2006/0155789 A1 Jul. 13, 2006

Related U.S. Application Data

(62) Division of application No. 09/967,856, filed on Sep. 28, 2001, now Pat. No. 7,039,669.

(51) Int. Cl.
*G06F 7/00* (2006.01)
*G06F 17/00* (2006.01)
*G06F 15/16* (2006.01)

(52) U.S. Cl. ............... 707/659; 707/622; 707/645
(58) Field of Classification Search ........... 707/659, 707/622, 645
See application file for complete search history.

(56) References Cited

U.S. PATENT DOCUMENTS

| | | | |
|---|---|---|---|
| 4,408,273 A | 10/1983 | Plow | |
| 5,440,732 A | 8/1995 | Lomet et al. | |
| 5,515,502 A | 5/1996 | Wood | |
| 5,596,706 A | 1/1997 | Shimazaki et al. | |
| 5,649,195 A | 7/1997 | Scott et al. | |
| 5,649,196 A * | 7/1997 | Woodhill et al. | 707/204 |
| 5,710,922 A | 1/1998 | Alley et al. | |
| 5,758,359 A * | 5/1998 | Saxon | 707/204 |
| 5,761,500 A * | 6/1998 | Gallant et al. | 707/10 |
| 5,768,532 A * | 6/1998 | Megerian | 709/245 |
| 5,778,395 A * | 7/1998 | Whiting et al. | 707/204 |
| 5,829,001 A * | 10/1998 | Li et al. | 707/10 |
| 5,862,325 A | 1/1999 | Reed et al. | |
| 5,949,876 A * | 9/1999 | Ginter et al. | 705/80 |

(Continued)

OTHER PUBLICATIONS

Charles Dye, Multi-Master Replication, In: Oracle Distributed Systems, Chapter 12, http://proquest.safaribooksonline.com/1565924320/ch12-36768, O'Reilly and Associates, Sebastopol, California, USA, Apr. 1999.*

(Continued)

*Primary Examiner*—Greta L Robinson
*Assistant Examiner*—Brian E Weinrich
(74) *Attorney, Agent, or Firm*—Hickman Palermo Truong & Becker LLP

(57) ABSTRACT

Techniques for making a replica of a particular group of database objects of a database on a particular node that does not initially have the particular group of database objects include determining whether conditions for copying a full database from a first node are satisfied. If conditions for copying the full database from the first node are not satisfied, then a database-object-copy routine is employed for each database object in the particular group of database objects. If conditions for copying the full database from the first node are satisfied, then a full-database-copy routine for performing a copy of an entire database is employed.

10 Claims, 15 Drawing Sheets

U.S. PATENT DOCUMENTS

| | | | |
|---|---|---|---|
| 5,991,768 | A | 11/1999 | Sun et al. |
| 6,014,669 | A * | 1/2000 | Slaughter et al. .............. 707/10 |
| 6,038,563 | A * | 3/2000 | Bapat et al. .................... 707/10 |
| 6,112,315 | A * | 8/2000 | Kuruvila et al. ............... 714/38 |
| 6,253,273 | B1 | 6/2001 | Blumenau |
| 6,256,773 | B1 * | 7/2001 | Bowman-Amuah ......... 717/121 |
| 6,272,491 | B1 | 8/2001 | Chan et al. |
| 6,381,627 | B1 * | 4/2002 | Kwan et al. ................. 709/201 |
| 6,453,404 | B1 | 9/2002 | Bereznyi et al. |
| 6,496,865 | B1 | 12/2002 | Sumsion et al. |
| 6,496,949 | B1 * | 12/2002 | Kanevsky et al. ............. 714/47 |
| 6,529,906 | B1 | 3/2003 | Chan |
| 6,920,454 | B1 | 7/2005 | Chan |
| 7,085,911 | B2 | 8/2006 | Sachedina et al. |
| 2002/0097724 | A1 | 7/2002 | Halme et al. |
| 2002/0147733 | A1 * | 10/2002 | Gold et al. .................. 707/200 |
| 2002/0194015 | A1 | 12/2002 | Gordon et al. |
| 2003/0005120 | A1 * | 1/2003 | Mutalik et al. .............. 709/223 |
| 2003/0163597 | A1 | 8/2003 | Hellman et al. |
| 2005/0149540 | A1 | 7/2005 | Chan et al. |

OTHER PUBLICATIONS

Tushar Mahapatra and Sanjay Mishra, Maintaining a Failover Database, In: Oracle Parallel Processing, Section 12.1, http://proquest.safaribooksonline.com/156592701X, ProQuest Information and Learning, O'Reilly and Associates, Sebastopol, California, USA, Aug. 2000.*

R. Elmasri and S. B. Navathe. Fundamentals of Database Systems (third edition). Addison-Wesley, New York, Jun. 2000, Title Pages, Preface, Sections 7.1, 17.1 and 24.2, pp. iii, iv, vii, viii, 195-202, 569-573 and 771-778.*

R. Elmasri and S. B. Navathe. Fundamentals of Database Systems (third edition). Addison-Wesley, New York, Jun. 2000, Title Pages, Preface, Chapter 2, Sections 7.1, 8.1, 17.1 and 24.2, pp. iii, iv, vii, viii, 23-39, 195-202, 243-251, 569-573 and 771-778.*

Oracle, "Oracle 8i Supplied Packages Reference, Release 8.1.5", Title page, part No. A68001-01, Copyright 1999 Oracle Corporation, Feb. 1999, retrieved from website <http://www.csee.umbc.edu/help/oracle8/server.815/a68001/title.htm>, 2 pages.

Oracle, "Oracle 8i Supplied Packages Reference, Release 8.1.5", Table of Contents, Feb. 1999, retrieved from website < http://www.csee.umbc.edu/help/oracle8/server.815/a68001/toc.htm >, 22 pages.

Oracle, "DBMS_Offline_OG", Oracle8i Supplied Packages Reference, Release 8.1.5, Feb. 1999, found on website < http://www.csee.umbc.edu/help/oracle8/server.815/a68001/dbms_off.htm >, 7 pages.

Mahapatra, Tushar, et al., "Application Failover", Oracle Parallel Processing, chapter 12, Copyright 2000 O'Reilly & Associates, Inc., published Aug. 2000, 5 pages.

Kirkland, Rob, "Replication", Copyright 2000 New Riders Publishing, Domino System Administration, chapter 9, published Nov. 17, 1999, 8 pages.

Dye, Charles, "Multi-Master Replication", Copyright 1999 O'Reilly & Associates, Inc., Oracle Distributed Systems, chapter 12, published Apr. 1999, 44 pages.

R. Elmasri and S.B. Navathe, "Fundamentals of Database Systems", Third Edition, Addison Wesley, New York, Jun. 2000, ISBN 0805317554, Section 1.2, p. 7 (1 page).

R. Elmasri and S.B. Navathe, "Fundamentals of Database Systems", Third Edition, Addison Wesley, New York, Jun. 2000, ISBN 0805317554, Section 1.3, pp. 8-11 (4 pages).

R. Elmasri and S.B. Navathe, "Fundamentals of Database Systems", Third Edition, Addison Wesley, New York, Jun. 2000, ISBN 0805317554, Section 21.7, p. 709 (1 page).

Dye, Charles, et al., "Multi-Master Replication, In: Oracle Distributed Systems", Chapter 12, O'Reilly and Associates, Apr. 1999, 54 pages.

Mahapatra, Tushar, et al., "Maintaining a Failover Database In: Oracle Parallel Processing", Section 12.1, ProQuest Information and Learning, O'Reilly and Associates, Aug. 2000, 6 pages.

* cited by examiner

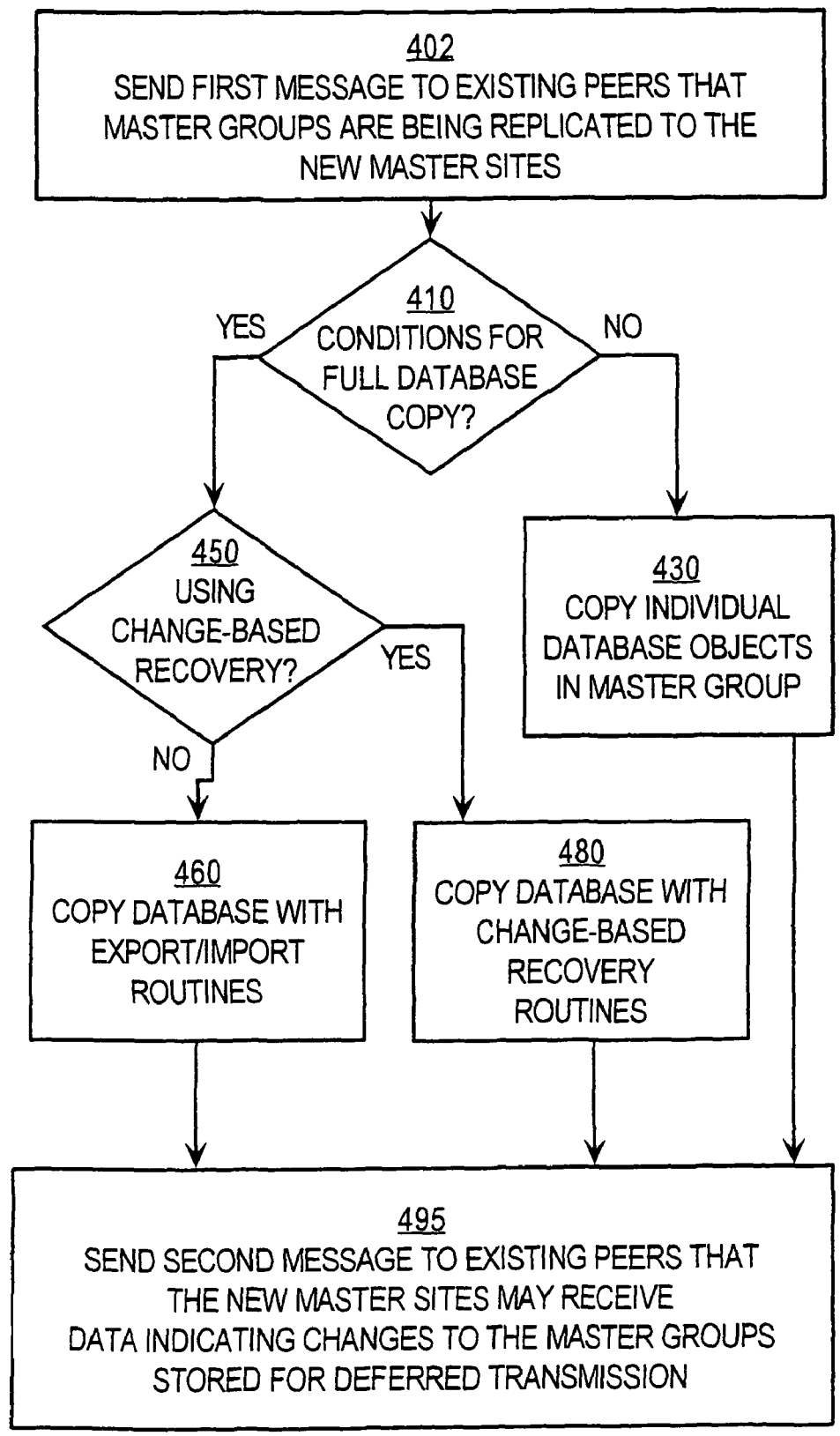

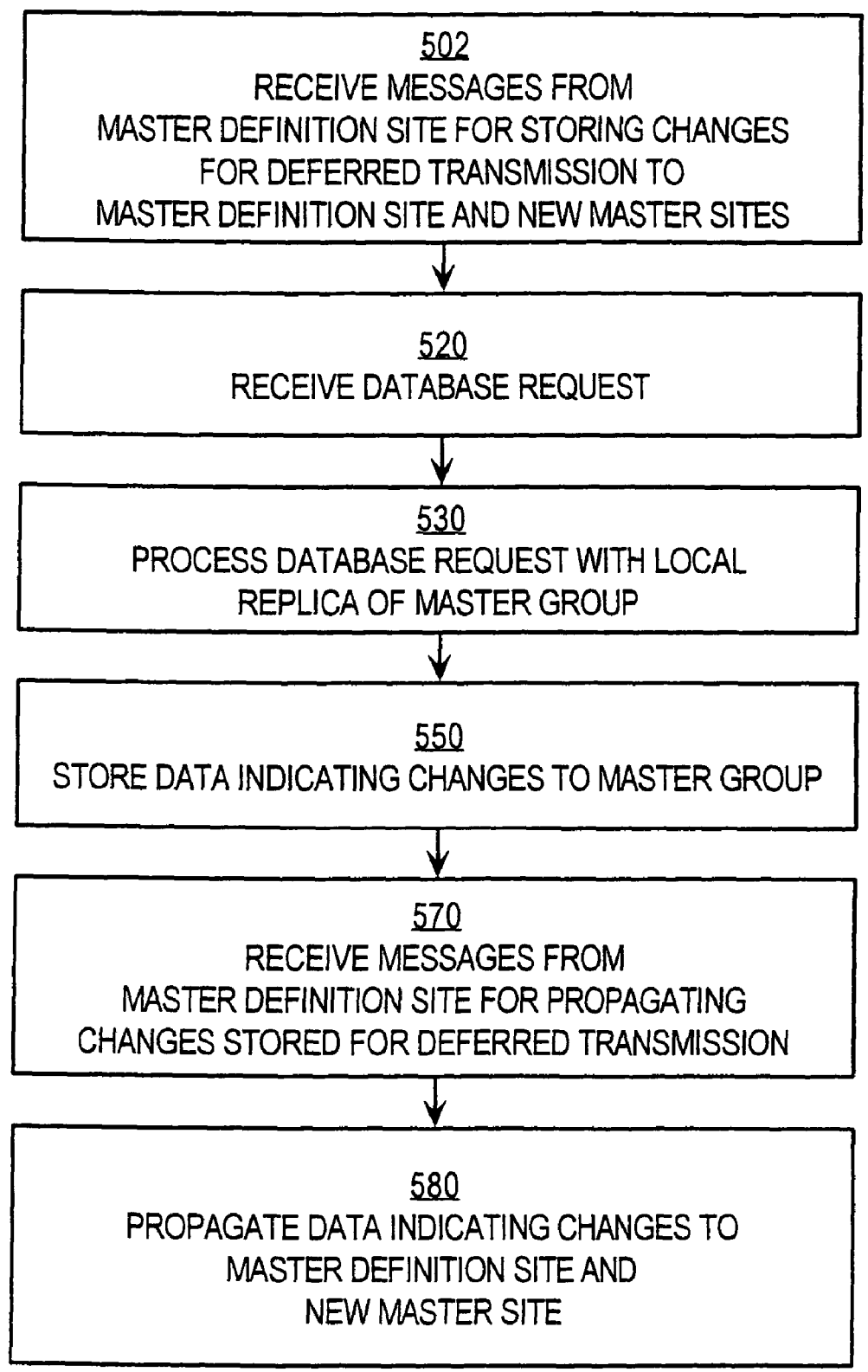

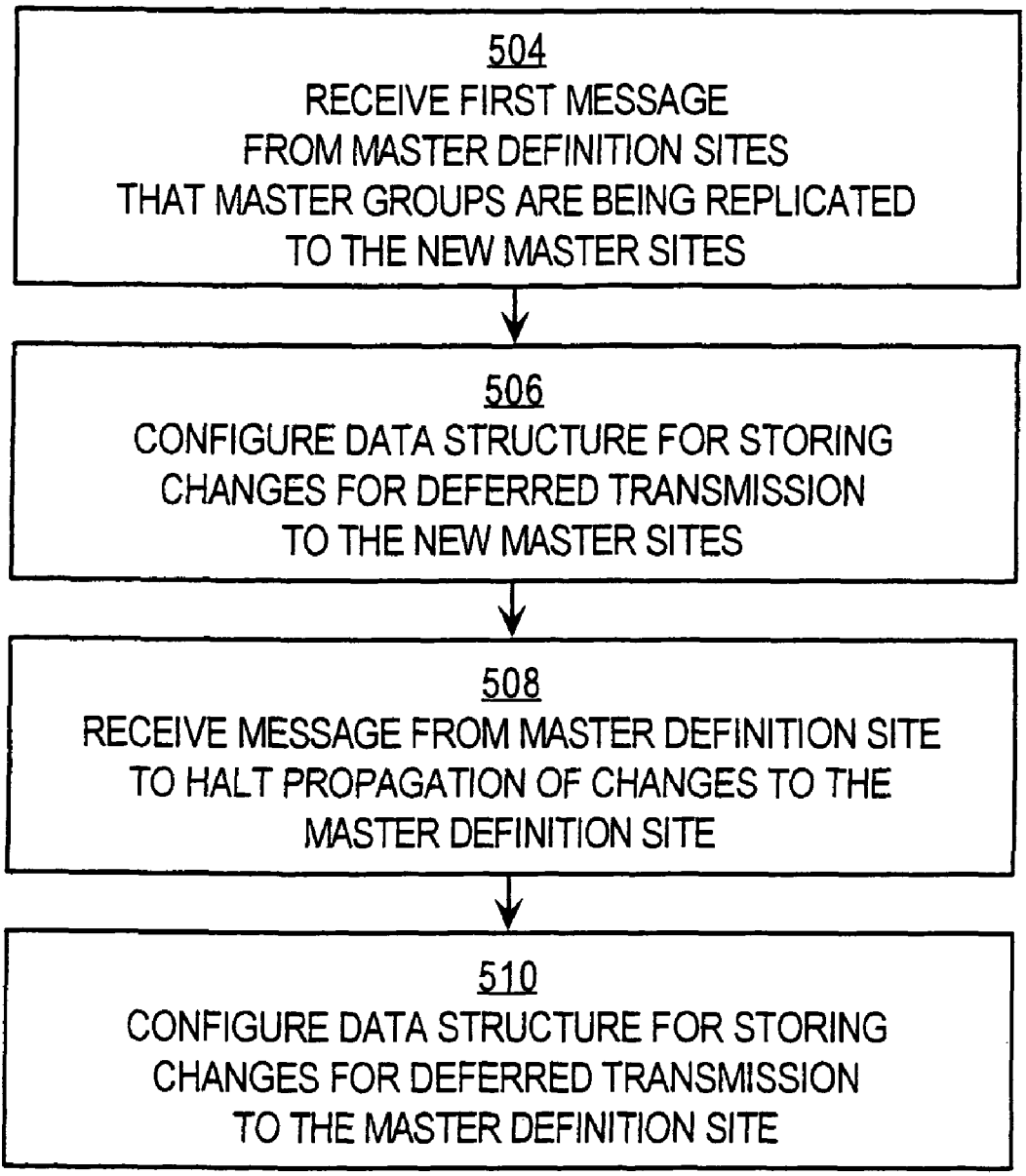

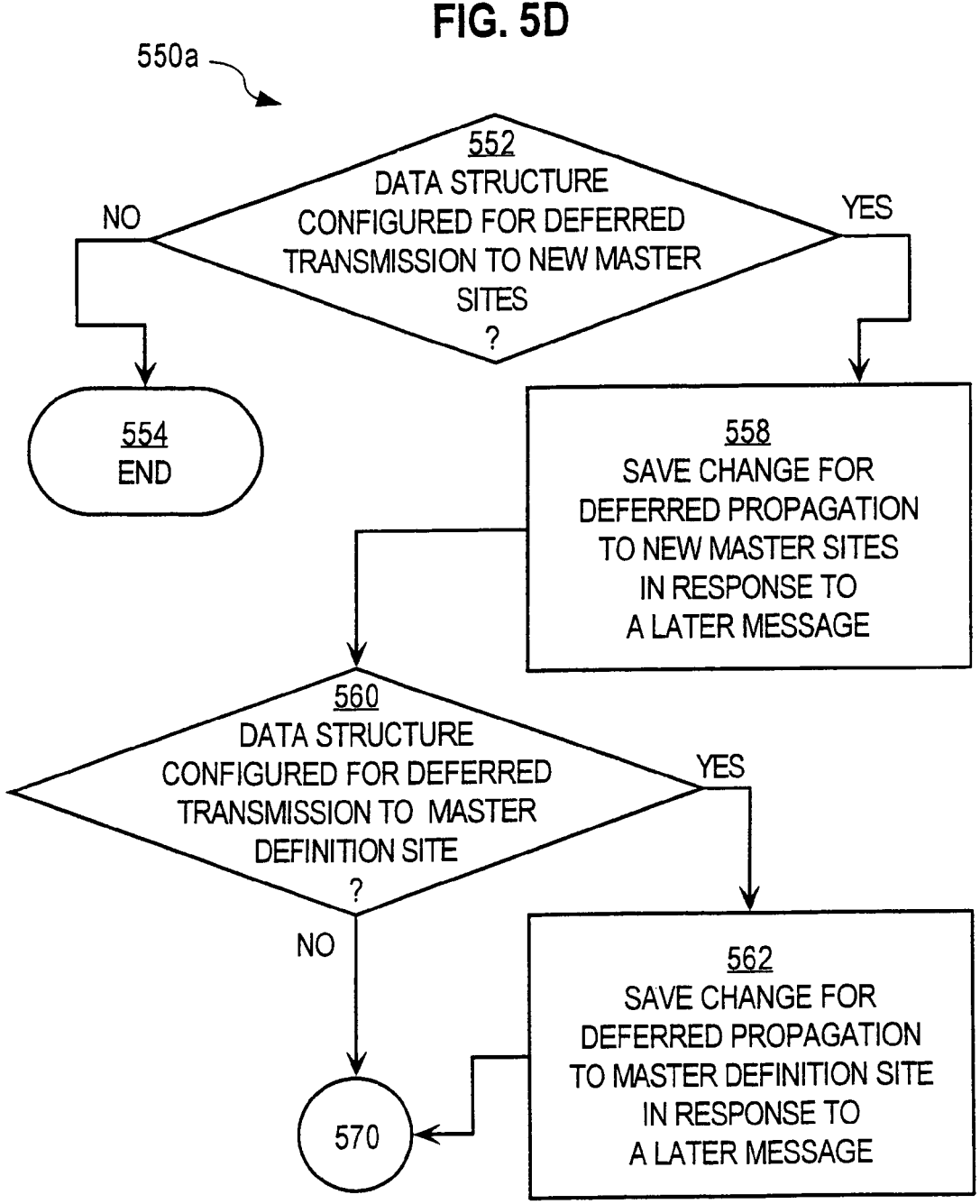

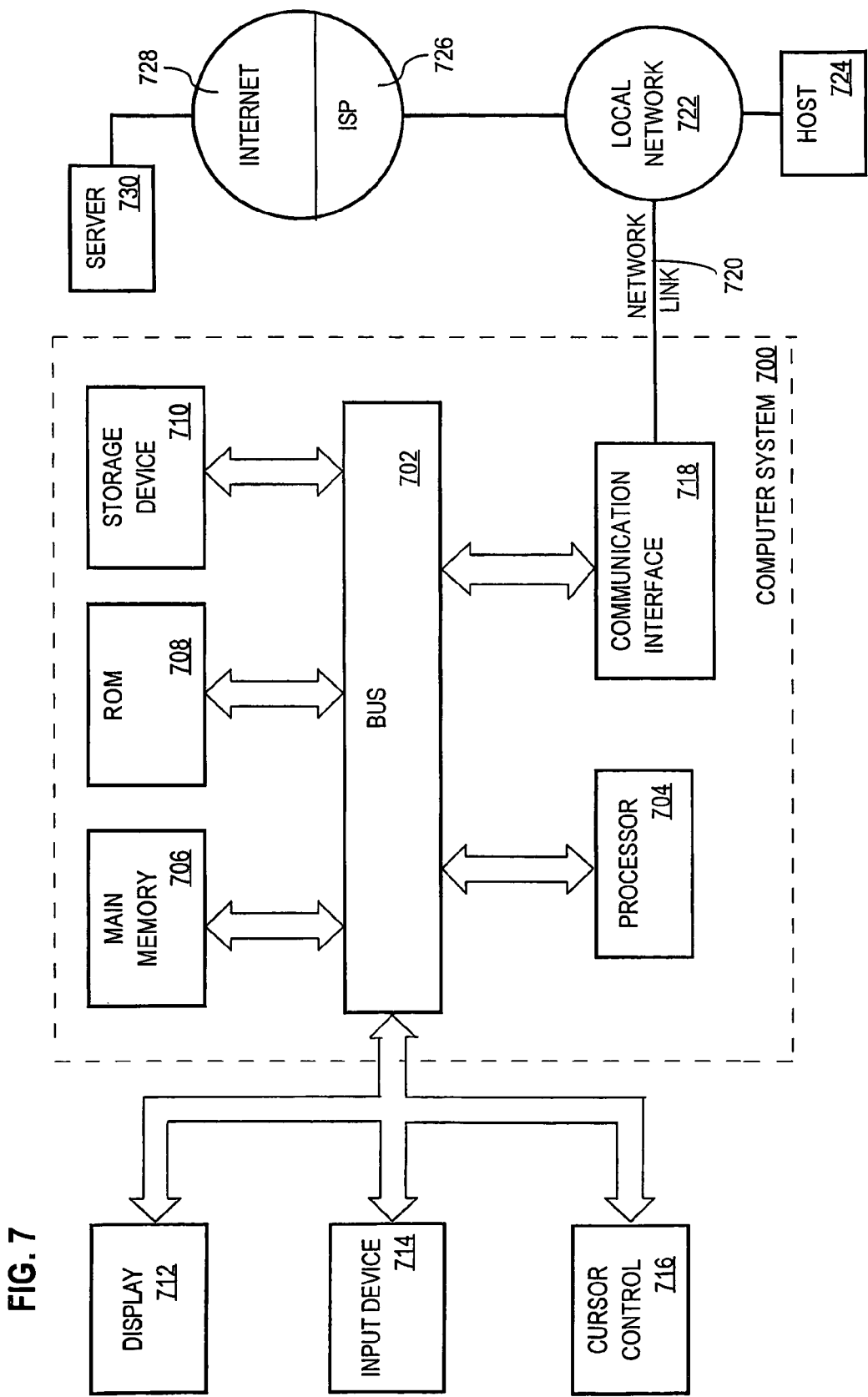

TECHNIQUES FOR REPLICATING GROUPS OF DATABASE OBJECTS

PRIORITY CLAIM

This application is a divisional of, and claims benefit of priority from, U.S. patent application Ser. No. 09/967,856, entitled "TECHNIQUES FOR ADDING A MASTER IN A DISTRIBUTED DATABASE WITHOUT SUSPENDING DATABASE OPERATIONS AT EXTANT MASTER SITES", filed by Lik Wong et al. on Sep. 28, 2001 now U.S. Pat. No. 7,039,669, the entire contents of which are hereby incorporated by reference for all purposes as if fully set forth herein.

FIELD OF THE INVENTION

The present invention relates to adding a new master site to a distributed database system that allows multiple master sites; and, in particular, to adding the new master site without suspending database operations at extant master sites.

BACKGROUND OF THE INVENTION

A database is made up of one or more database objects. Database objects are logical data structures that are used by a database server to store and organize both data in the database and procedures that operate on the data in the database. For example, in a relational database, a table is a database object with data arranged in rows, each row having one or more columns representing different attributes or fields. Another database object in the relational database is a database view of certain rows and columns of one or more database tables. Another database object in the relational database is an index. An index typically stores values from a key column in a database table, and points to the rows in the table that have a particular value in the key column.

Another database object in the relational database is a database trigger. A database trigger is a procedure that is executed upon an operation involving a database table. Data manipulation operations include adding a row, deleting a row, and modifying contents of a row, among others. Database definition operations include adding a table, adding a column to a table, and adding an index to a table, among others. Another database object in the relational database is a package of procedures that may be invoked and executed by the database server.

Data in a database is often shared among many users for multiple applications. For example, data in an employee database of a multinational corporation is shared among corporate officials and personnel for accounting, payroll and human resources departments, each running a different application program that uses data in the database. The applications send queries to a common database server. Based on the queries, the database server retrieves data from the database or changes the database—such as by adding, deleting or modifying the data in the database objects, or by adding, deleting or modifying the structure of the database objects themselves.

In many circumstances, it is advantageous to copy some or all of the database objects constituting the database to multiple sites on a network. Replication is the process of copying and maintaining database objects in multiple databases that make up a distributed database system. Changes applied at one site are captured and stored locally before being forwarded and applied at each of the other, remote sites. The application of the changes made at each site to each other site is a process called convergence or synchronization.

Replication provides a user at any site fast, local access to shared data. Replication also enhances availability of the database and the applications that employ the database because, if one site goes down, the database at another site can be accessed for data retrieval and for updating.

A group of database objects replicated together is called a replication group. Often a replication group is created for a subset of the database objects in one or more databases used to support a particular database application. One architecture for distributed databases involves multiple master sites, called peers, which each contain the same database objects in a master replication group, also called, simply, a master group. The database servers at each master site automatically work to propagate changes for all database objects in the master group to all the peers, in order to ensure transaction consistency and data integrity.

A problem noted with current distributed databases is that, after a set of master sites has been established, it is difficult to add another master site. The particular network node that is to be used as the new master site is incapable of processing the changes to the database objects being propagated by the extant master sites until after the database objects in the master group have been instantiated (i.e., created) on the particular node. Even then, the particular node cannot process the changes as a normal master site would do until all the data, in the database objects before those changes, have been loaded into the newly instantiated database objects on the particular node.

Consequently, when adding a new master site, replication of the master group of the distributed database is suspended (i.e., goes into a quiescent mode in which replication does not occur). Suspending replication activity for a master group is called quiescing the master group. Changes already made at any master node are propagated to the other master nodes before quiescing the master group. During a quiescent period, while replication is suspended, transactions that change the contents or structure of the database objects would lead to inconsistencies among the master nodes. Therefore, a system administrator makes the master group unavailable to a user before quiescing the master group. A user is not allowed to request any services from the database for the master group at any master site during the quiescent period. The quiescent period lasts until the new master site has all the database objects of the master group instantiated and loaded with data so that the master group on the new site is in the same state that the master groups on the other master sites were in at the start of the quiescent period. This quiescent period may last hours and even days for large databases.

Making a distributed database unavailable for a quiescent period is a severe problem for commercial applications. The distributed databases most likely to add a master site are those supporting applications with a fast growing pool of users distributed over a large area, often encompassing many time zones and consequently demanding operations around the clock. Such commercial applications often process orders that involve adding data to the database. The applications would have to suspend operations during the quiescent period each time a new master site is added to meet the growing demands. Each suspension of operations involves many lost orders and consequently significant lost revenue. In addition, there is a chance a user will be so dissatisfied that the user determines not to return as a customer of the enterprise providing the commercial application. The problem compounds as operations are suspended repeatedly as new master sites are added to accommodate growth.

Based on the foregoing, there is a clear need for a system that adds a new master site for a distributed database, by making a replica of the master group at the new site, without suspending database operations involving the master group at extant master sites.

SUMMARY OF THE INVENTION

Techniques are provided for making a replica of a particular group of database objects of a database on a particular node that does not initially have the particular group of database objects. The techniques include transferring, from a first node to the particular node, data that describes the particular group of database objects. The transfer takes place during a particular time period. Unlike the quiescent period used by conventional replication systems, using the techniques described herein, requests to perform operations that involve data in the particular group of database objects continue to be processed during the particular time period in which the data that describes the particular group of database objects is being transferred to the new master node.

In another aspect of the invention, techniques for making a replica of a particular group of database objects on a particular node of a network include determining whether conditions for copying a full database from a master definition node are satisfied. The particular node does not initially have the particular group of database objects. The master definition node stores the particular group of database objects. The master definition node is authorized to define members of the particular group, while other master nodes are not so authorized. If conditions for copying the full database on the first node are not satisfied, then a routine for copying an individual database object is employed to copy each database object in the particular group. If conditions for copying the full database on the first node are satisfied, then a full-database-copy routine is employed for performing a copy of an entire database installed on a node.

According to another aspect of the invention, database operations on a particular group of database objects can be performed while making a replica of the particular group. One technique for achieving this involves receiving a request to perform an operation, where the operation involves data ("first data") that belongs to the particular group of database objects. The request is received at a first node from a user of the database. The first node stores a replica of the particular group before the replica of the particular group is made on the particular node. The operation is performed on the first node. Second data are stored. The second data indicates changes to the particular group of database objects on the first node based on the request. The second data are stored in a first data structure for deferred transmission to the particular node. The second data is transferred from the first data structure to the particular node after the replica of the particular group is made on the particular node.

According to another aspect of the invention, techniques for making a replica of a particular group of database objects of a database on a particular node of a network include receiving at the particular node, from a first node on the network during a transfer period, a first copy of the particular group of objects. In addition to receiving the first copy, the particular node receives data from a second node on the network. The data indicates changes to the particular group of database objects. The changes indicated by the data are changes that were made to the data on the second node during the transfer period. The first copy of the particular group is modified based on the data indicating the changes.

According to another aspect of the invention, techniques are provided for adding a particular node as a peer node to other nodes that belong to a distributed database system. One technique involves making a replica of a particular master group of database objects of the database on the particular node. Making the replica involves receiving input that specifies the particular node and the particular master group of database objects. A first peer node is selected to be a source for the particular master group of database objects. The first peer node is a master definition node authorized to define members of the particular group. Description data that describes the particular master group of database objects are transferred from the first peer node to the particular node during a transfer period. The transferring further includes determining whether first conditions for copying a full database are satisfied. If the first conditions are satisfied, then a database function for exporting the full database is used. If the first conditions are not satisfied, then database functions for exporting individual database objects are used.

Making the replica also includes processing a request during the transfer period. The request is to perform an operation involving data in the particular master group of database objects. The processing of the request includes sending a first message to a second peer node that stores a copy of the particular group. The first message indicates that a replica of the particular master group of database objects is being made on the particular node. In response to the first message, data that indicates changes to the particular master group at the second peer node are stored. After the end-transfer time, a second message is sent to the second node. The second message indicates that the particular node may receive the data indicating changes.

At the same time, the first peer node also processes requests to perform operations involving the particular group of database objects. First-node change data indicates changes made to the particular master group on the first node based on the request. The first-node change data are stored for deferred transmission to the particular node. After the end-time, when the second message is sent to the second node, the first-node change data is sent to the particular node.

According to another aspect of the invention, a system for making a replica of a particular group of database objects includes a network, a particular node connected to the network, and one or more peer nodes connected to the network. Each peer node stores a replica of the particular group of database objects. A first node of the peer nodes includes one or more processors configured for transferring description data from the first node to the particular node during a transfer period. A second node of the peer nodes includes one or more processors configured for responding to a request during the transfer period. The request is to perform an operation involving data in the particular group of database objects.

These techniques allow new master sites to be added for an existing master group of a distributed database without suspending database operations involving the master group at the existing master sites. The distributed databases most likely to add the additional master site is a heavily used distributed database. Thus these techniques allow a database administrator to avoid bringing down a heavily used distributed database for hours or days just to provide additional computational resources for the distributed database.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A is a flowchart that illustrates detailed steps of an embodiment of one step of the method depicted in FIG. 2;

FIG. 5A is a flowchart that illustrates detailed steps of an embodiment of one step of the method depicted in FIG. 2;

FIG. 5B is a flowchart that illustrates detailed steps of an embodiment of one step of the method depicted in FIG. 5A;

FIG. 5D is a flowchart that illustrates detailed steps of an embodiment of one step of the method depicted in FIG. 5A;

FIG. 7 is a block diagram that illustrates a computer system upon which an embodiment of the invention may be implemented.

DETAILED DESCRIPTION OF THE PREFERRED EMBODIMENT

A method and apparatus for replicating groups of database objects without quiescing are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

Figure 1A:
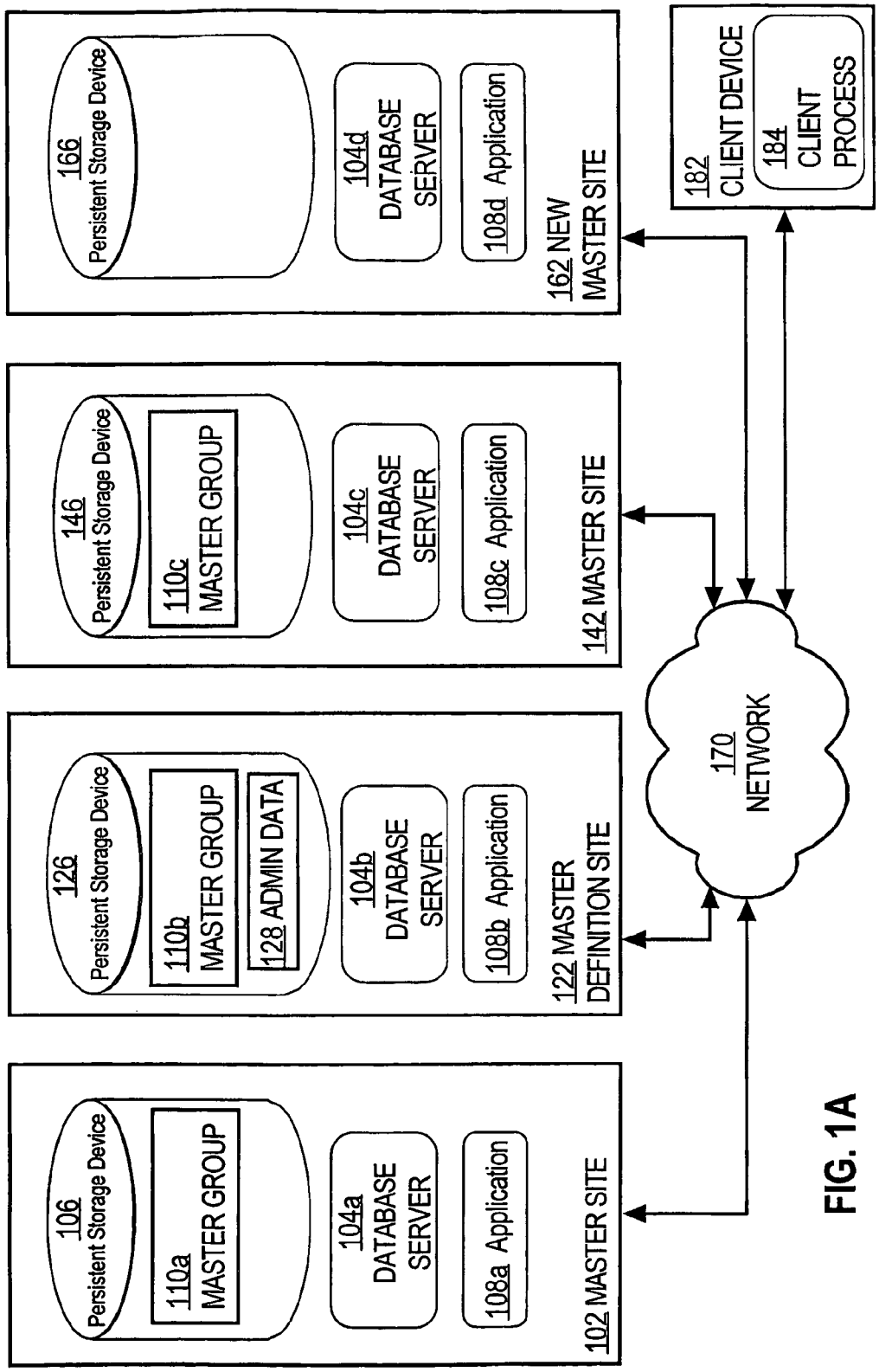
FIG. 1A is a block diagram that illustrates a distributed database system in which an embodiment of the invention may be implemented.

FIG. 1A is a block diagram that illustrates a distributed database system in which an embodiment of the invention may be implemented. According to the illustrated embodiment, four nodes that serve as database sites 102, 122, 142, 162 are connected to a network 170. Each node includes a persistent storage device, 106, 126, 146, and 166. Each node also includes an instance 104a, 104b, 104c, 104d, respectively, of a database server 104.

The illustrated embodiment shows a distributed database that has three replicas 110a, 110b, 110c of a master group 110 of database objects. The three replicas reside on three nodes, 102, 122, 142, respectively, called master sites. One of the master sites (site 122) is called a master definition site for the master group 110. The master definition site 122 includes replication administrative data in a data structure 128 that authorizes the master definition site to define and change members of the master group, and define and change the structure of the database objects in the master group.

The database server 104b on the master definition site 122 initiates the administration of replication of the master group 110 on other nodes. One function of the database server on the master definition site is to maintain a replication catalog (132 in FIG. 1B) on each master site. The replication catalog of a master group lists (1) the master sites for the master group and (2) the database objects in the master group.

For the purpose of explanation, the system shown in FIG. 1 includes only one master group. However, it is possible for one or more of the nodes 102, 122, 142 and 162 to contain other master groups of different database objects. Each different master group has a corresponding master definition site and different nodes may serve as the master definition sites for different master groups. Each different master group may be replicated on a different set of nodes serving as master sites.

Nodes other than master sites 102, 122 and 142 may contain groups of database objects that are not master groups, e.g., that include less than all the database objects in the replicas of the master group or that include only materialized views, i.e., copies of certain rows and columns of one or more tables embodied as additional tables.

Each node includes a copy 108a, 108b, 108c, 108d, respectively, of an application 108 that uses the database server to manage data that is used by the application. In other embodiments, in which users issue database commands to directly control the database server, the application may be omitted.

A user typically employs a client device 182 on which is running a client process 184. In response to the user's input, the client process 184 makes requests of a database server, possibly through the application 108, for data. The data accessed by those requests may belong to a particular group of database objects. For example, a request may involve retrieving data from one or more database objects in the group, or changing the data in one or more database objects in the group.

The user's request is routed over the network 170 to one of the nodes that stores the group involved in the request. The routing may be based on the load experienced by each node, so that the user's request is sent to the master site experiencing the lightest load of requests. The routing may also be based on proximity, either geographically or by number of switches in the network to traverse, so that the user's request is sent to the closest master site. In some embodiments, the client device 182 is directly connected to one of the nodes 102, 122, 142, 162 so that the database server on the node directly connected to the client device first handles the request.

A group of database objects and, possibly, one or more applications are replicated on several nodes for a variety of reasons including: to provide redundancy in case of failure; to distribute the load placed by multiple users; and to locate the data in the master group closer to the user in order to reduce wait times for information to traverse the network (also called network latency) and in order to reduce network traffic for other users of the network.

The database server 104 supports the distributed database by allowing changes to be made to data in the local replica of the master group and propagating those changes to the other master sites for the changed master group. This process of propagating changes to replicas of a master group is sometimes called synchronization. However, synchronization is a misnomer in the context of change propagation because the process does not promise perfect duplicates at all sites at any particular time. In conventional database servers, the changes are sent on a predefined schedule that depends on settings by the database administrator, bandwidth of the network, and traffic on the network According to an embodiment, a distributed database system includes a database server 104 configured to propagate changes for a master group to prevent the loss of change information about the master group during replication of the master group to one or more new master sites—when the new master sites are still unable to process any changes propagated to the new sites.

Figure 1B:
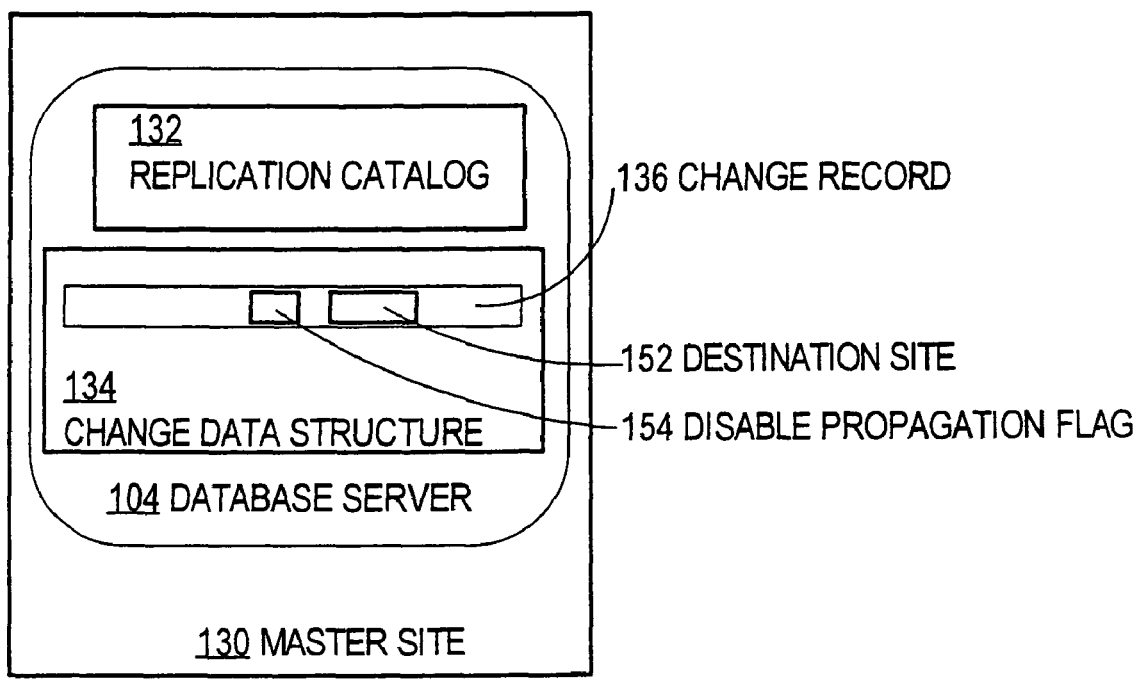
FIG. 1B is a block diagram that illustrates structures used by a database server of the distributed database system of FIG. 1A.

FIG. 1B is a block diagram that illustrates data structures used by a database server 104 of the distributed database system of FIG. 1A. The master site 130 represents any of the master sites 102, 122, 142 depicted in FIG. 1A. Within the replication catalog 132, the database server maintains a list of the database objects that comprise the master group and the master sites where the master group is replicated. The replication catalog also includes data that indicates the master definition site for the master group. The database server on the master definition site maintains an original list and is authorized to change the members of the master group and the sites that host the master group. Other master sites obtain the lists in the replication catalog from the master definition site.

The database server also maintains a change queue data structure 134 for storing data indicating changes to the master group made on the local master site 130. In the illustrated embodiment, the data structure 134 is held in volatile storage such as dynamic memory of a computer system. In some embodiments, the data structure 134 is stored partially or completely on persistent storage of a computer system.

Storage of change data for deferred transmission is distinguished from storage of changes that are propagated to other master sites according to a conventional schedule. The changes stored for propagation on the conventional schedule are sometimes called "deferred transactions." However, the changes for deferred transmission are not propagated on the conventional schedule, but are propagated only after later notice is received that propagation may proceed. For example, the changes are only propagated in response to a later message from the master definition site 122 or the new master site 162. Thus "deferred transactions" and deferred transmission are herein distinguished. To avoid confusion, the term "deferred transactions" is not used hereinafter. Instead, the term "changes propagated according to the conventional schedule" is used.

In some embodiments, the list in the replication catalog indicates each site that is subject to deferred transmission. According to some embodiments, the change queue data structure 134 includes fields for indicating whether deferred transmission of changes apply to any sites. According to the illustrated embodiment, each change record includes two fields 152 and 154, described below, for indicating whether the change is subject to deferred transmission. In other embodiments separate change queue data structures are formed for each site subject to deferred transmission of changes. In still other embodiments, one change queue data structure is used for changes propagated according to the conventional schedule and a second change queue data structure is used for changes for all sites subject to deferred transmission.

According to the illustrated embodiment, field 152 stores data that specifies a destination site to which propagation of change data associated with change record 136 is subject to deferred transmission (e.g., deferred until further notice). For example, if changes are not propagated according to the conventional schedule to the new master site, field 152 contains data indicating an address of the new master site. In another embodiment, field 152 contains data indicating a reference to the new master site in the replication catalog. In some circumstances, described below, changes are also not propagated according to the conventional schedule to the master definition site. In such circumstances, field 152 contains data indicating an address of the master definition site. In another embodiment, the field contains data indicating a reference to the master definition site in the replication catalog.

According to the illustrated embodiment, field 154 stores a "disable" flag that is set to an "ON" state to indicate that propagation to the destination associated with the change record 136 is disabled, for deferred transmission (e.g., for propagation at an unspecified later time upon receipt of further notice). When the disable flag is set to an "OFF" state, or if no record indicating a destination site is present in the change data structure, data indicating changes are propagated to the destination site according to the conventional schedule.

To illustrate embodiments of the methods that follow, an example is described in which node 162 is designated by a database administrator to become a new master site for master group 110 to locally support operations of application 108*d* on node 162.

Functional Overview

Figure 2:
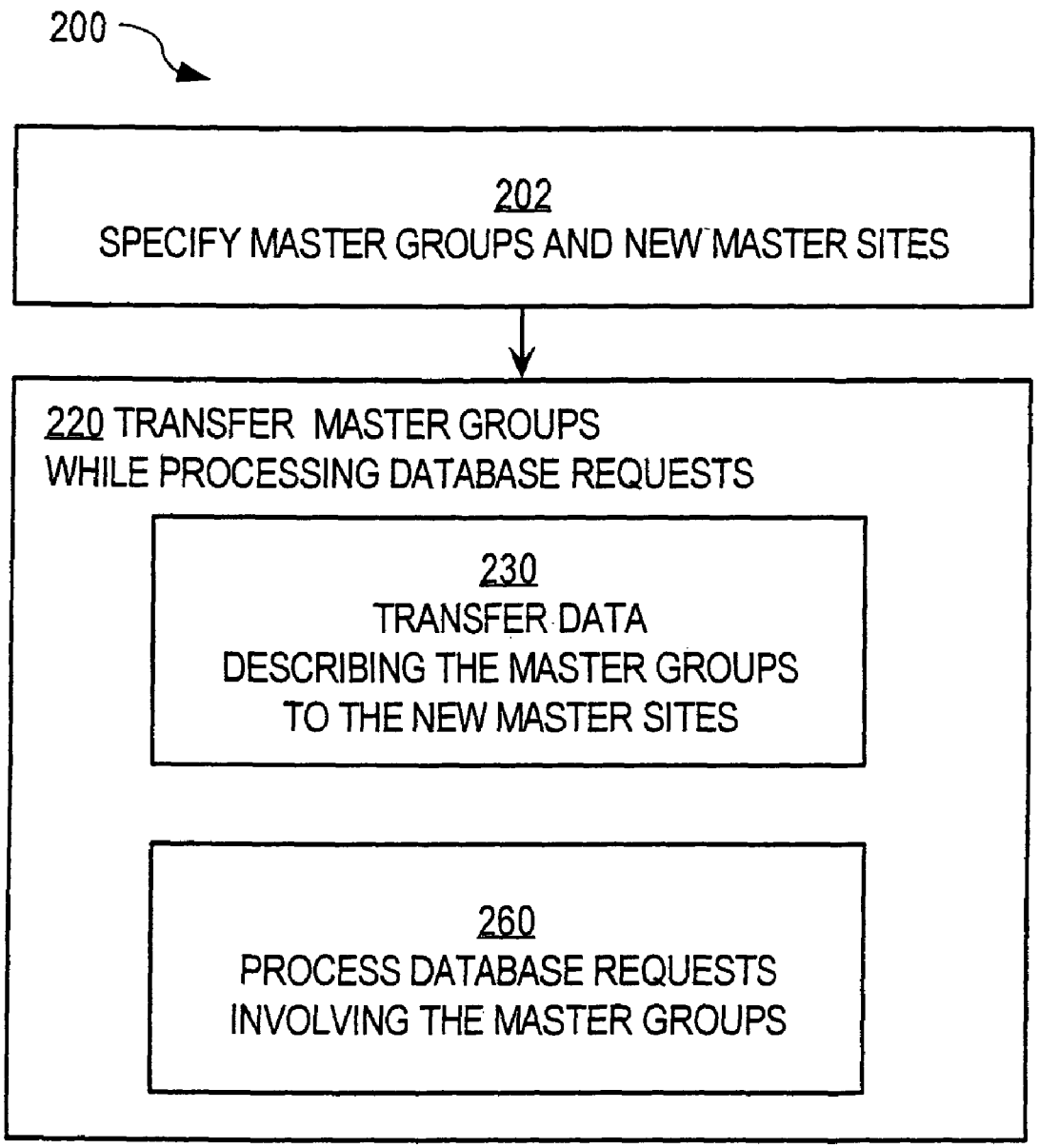
FIG. 2 is a flowchart that illustrates a high level view of a method for replicating groups of database objects onto a new master site according to an embodiment.

FIG. 2 is a flowchart that illustrates a high level view of a method 200 for replicating groups of database objects onto a new master site without quiescing, according to an embodiment. In step 202, an administrator for a distributed database specifies one or more new master sites for one or more master groups.

In step 220, data describing the master groups are transferred to the new master sites, while one or more database servers on one or more of the existing master sites continues to process database requests involving the master groups. Each database server on an existing master site that is responsible for continuing to process a request involving the master group is also responsible for retaining change information about the master group for the new master sites. Thus, step 220 includes steps 230 and 260. In step 230, a database server on at least one existing master site transfers data describing the master groups to the new master sites. In step 260, a database server on at least one existing master site processes database requests involving the master groups being transferred to the new sites.

The steps illustrated in FIG. 2 are described in greater detail hereafter. Specifically, an embodiment of step 202 is described in more detail below with reference to FIG. 3. An embodiment of step 230 is described in more detail below with reference to FIG. 4A. An embodiment of step 260 is described in more detail below with reference to FIG. 5A.

Although the steps in the various flowcharts used to illustrate embodiments of the invention are illustrated in a particular order, the steps may be reordered or occur at overlapping times in other embodiments.

Specifying Replication

Figure 3:
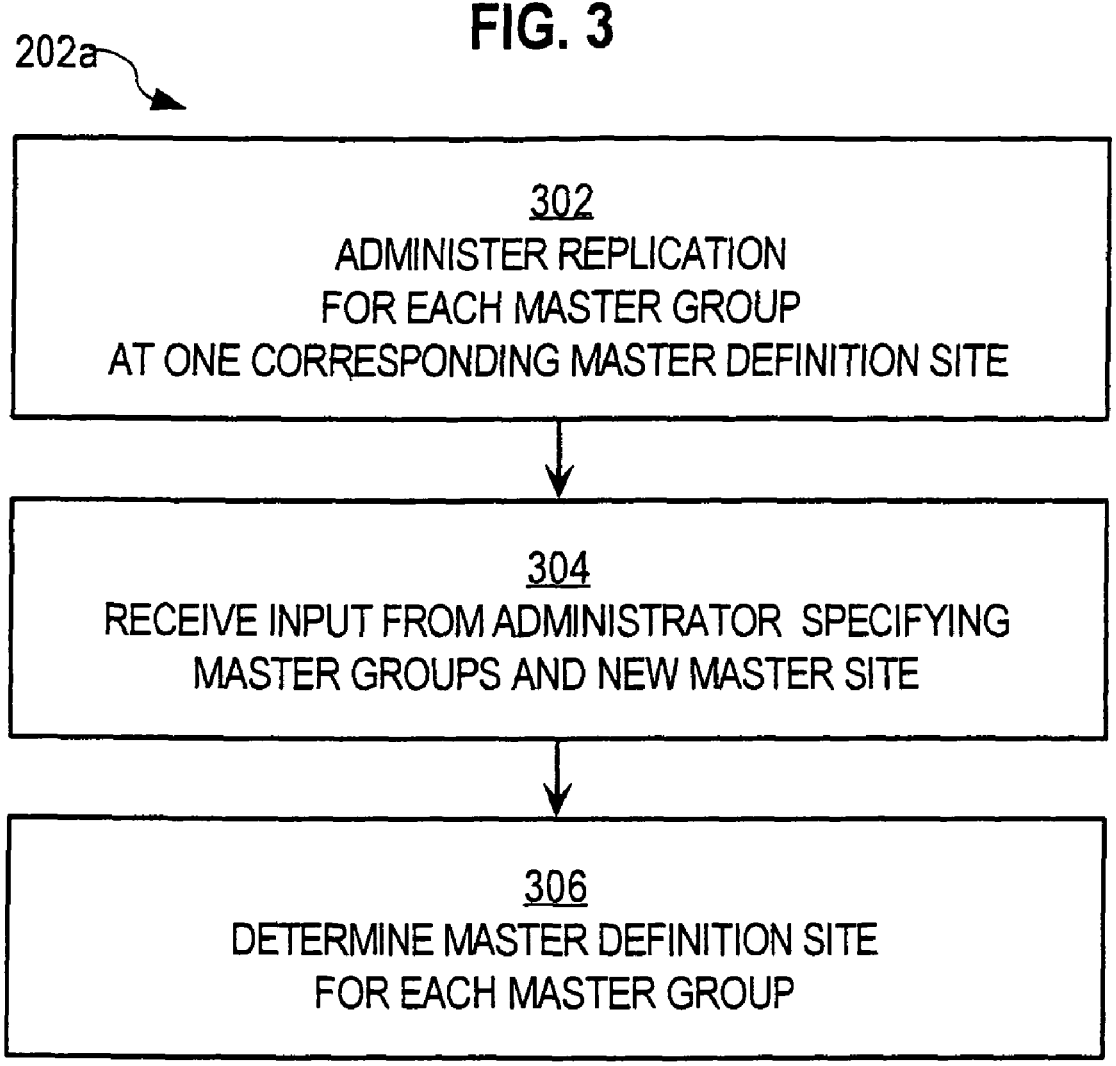
FIG. 3 is a flowchart that illustrates detailed steps of an embodiment of one step of the method depicted in FIG. 2.

FIG. 3 is a flowchart that illustrates detailed steps for specifying master groups and new master sites, according to an embodiment 202*a* of step 202 of the method 200 depicted in FIG. 2.

In step 302 the database server at the master definition site for each master group administers replication of the master group. For example, database server 104*b* at master definition site 122 for master group 110, designated by replication administration data in data structure 128, administers replication of master group 110.

In step 304, a database server receives input from the administrator specifying one or more new master sites and one or more master groups to replicate to the new master sites. For example, the administrator makes a call to a "specify_new_masters" routine inputting as parameters of the routine names for the new master site 162 and the master group 110 to replicate to new master site 162.

In step 306, the master definition sites are determined for the master groups that are specified in the input from the administrator. In some embodiments, the database server determines the master definition site based on the name of the master group and the replication administration data. For example, if the administrator is interacting with the database server 104a, when the administrator makes a call to the specify_new_masters routine, the specify_new_masters routine invoked by database server 104a determines that node 122 is the master definition site because node 122 includes the replication administration data in data structure 128 designating the master definition site for master group 110. In some embodiments, the administrator determines the master definition site and specifies the master definition site explicitly. For example, the administrator interacts with the database server 104b on the master definition site. In another example, to determine the master definition site, the administrator interacting with database server 104a inputs data indicating the server 104b or the master definition site 122 or both.

Transferring Master Groups without Quiescing

FIG. 4A is a flowchart that illustrates detailed steps for transferring data describing master groups according to an embodiment 230a of step 230 of the method 200 depicted in FIG. 2.

In step 402, a first message is sent to the database servers on the existing master sites that master groups are being replicated to the new master sites. In one embodiment, separate messages are sent for each master group from the database server on the corresponding master definition site. For example, an administrator invokes an add_new_masters routine on the database server that automatically causes the first message to be sent by database server 104b from master definition site 122 to the database servers on the other master sites 102, 142.

In response to receiving this message, the database servers on the existing master sites, including the master definition site, add the new masters to the replication catalog for the master group. For example, each of the database servers 104a, 104b, 104c adds node 162 to the replication catalog 132 maintained by that server. Also, as described in more detail below with reference to FIG. 5A and FIG. 5B, the database servers on the receiving master sites, including the master definition site, configure a data structure for (1) disabling propagation to the new master sites so that propagation is not performed according to the conventional schedule to those sites, and (2) storing data indicating changes for the master group. For example, a record is made in the change data structure 134 that includes an address for new master site 162 in the destination site field 152 and a flag 154 set to indicate propagation to the new master site 162 is disabled. In some embodiments, the data structure 134 is configured upon receipt of the first message. In other embodiments, the data structure 134 is configured at a later time indicated by the first message. For example, the data structure 134 is configured at a particular time indicated by the first message that is five minutes after the time the first message is sent. Five minutes allows enough time for every master site to receive the message in time to reconfigure the data structure so that all master nodes start recording changes for deferred transmission to the new master sites at the same time.

Data describing the new master sites may be transferred based on any one of a variety of available routines of the database server employed to transfer data. Available export and import routines may be used for individual database objects. Herein an available routine for copying an individual database object to a new site is called an available database-object-copying routine. Alternatively, available export and import routines for an entire database at a master definition site may be employed. In another alternative, the entire database can be constructed on each new master site using available database recovery routines that include changes up to a particular time ("change-based recovery routines"). In the following, the term "full-database-copy routine" refers to either a full database export routine or a full database change-based recovery routine.

Steps 410 and 450 represent branch points based on the type of copying routines employed. The information that determines which branch to take can be generated at any step at or before the decision point. For example the administrator may input the information indicating the copying routine during step 202 shown in FIG. 2. As another example, the database server can select a routine automatically, favoring a full-database-copy routine unless automatically evaluated conditions prohibit a full-database-copy routine. The branch point can be evaluated at any point after the information to make the decision is provided, as long as the steps before the branch point illustrated in FIG. 4A and the newly positioned branch point are included in each branch.

In step 410, it is determined whether conditions for applying a full-database-copy routine are satisfied. If not, control passes to step 430 to copy database objects in the master group one database object at a time. If conditions for applying a full-database-copy routine are satisfied, control passes to step 450 to determine which full-database-copy routine is to be used. Using a full-database-copy routine causes all master groups on the master definition site to be copied onto the new master sites. The conditions for applying a full-database-copy routine are not satisfied if a configuration planned for the new master site differs from a configuration at the master definition site in some significant way. An embodiment of step 410 is described in more detail below with reference to FIG. 4B.

In step 430, the database objects in the master group are copied to the new master sites individually. Step 430 includes forming the replication catalog for the new masters and adding the new masters to the replication catalog on the new sites before calling the available database-object-copying routine successively for each database object in the master group. For example, if the master group is copied as individual database objects, then the database server 104b on the master definition site sends a message to the database server 104d on new master site 162 to automatically form the replication catalog. An embodiment of step 430 is described in more detail below with reference to FIG. 4C.

When copying database objects individually, some are copied exactly as they are on the master definition site, and some are regenerated from the definitions of the database object. For example, tables and packages of procedures are copied exactly, but indexes are regenerated based on the key columns and the underlying tables.

In step 450, it is determined whether change-based recovery of a full database is to be used. If so, control passes to step 480 to copy the full database with the change-based recovery routines. If not, control passes to step 460 to copy the full database with database export and import routines. An embodiment of step 460 is described in more detail below with reference to FIG. 4D.

In step 480, the database servers on the new master sites use change-based recovery routines to establish replicas on the new master sites of all the master groups on one of the master definition site. In change-based recovery a database server reconstitutes a database at the master definition site based on an archived, backup version of the database and changes stored by a recovery system of the database server since the archive was made. The change-based recovery can be employed to return the database to a state the database occupied at any time since the archive was made.

For example, database server 104*d* uses change-based recovery based on the archives and changes stored on the master definition site 122 to establish replicas on the new master site 162 of all the master groups from master definition site 122 at the particular time indicated by the first message sent to existing peers in step 402. Changes after that time are stored on each master site for deferred transmission to the new master site, as described in more detail below with reference to FIG. 5A and FIG. 5B. Using change-based recovery, propagation of changes to the master definition site is halted for a time that is shorter than would be perceived by a human user of the distributed database. Halting the propagation of changes to the master definition site is described in more detail below for available export routines with reference to FIG. 4C and FIG. 4D.

In other embodiments, other available routines for copying a database or a database object may be used.

After the database objects of the master group have been created and filled with the content on the master definition site as of the particular time indicated by the first message, using any of the available routines, control passes to step 495. For example, after step 430 or 460 or 480, control passes to step 495.

In step 495, one of the database servers sends a second message to extant peers that the new master sites may begin receiving data indicating the changes to the master groups made at the extant peers and stored for deferred transmission to the new master sites. For example, a call is made to a new database server routine called "prepare_instantiated_master" which causes the message to be sent. In response to this message, all the master sites, including the master definition site, begin pushing to the new master site the data indicating changes made at each extant master site since the particular time of the first message, as described in more detail below with respect to FIG. 5E.

In one embodiment, database server 104*b* on the master definition site sends the second message to extant master sites 102, 142 that the new master site 162 can receive changes to the master group. In another embodiment, database server 104*d* on the new master site sends the message to extant master sites 102, 122, 142 that the new master site 162 can receive changes to the master group. In response to this message, all three master sites 102, 122, 142 begin pushing to the new master site 162 the data indicating changes made at each extant master site since the particular time indicated by the first message.

Determining Whether to Copy the Full Database

Figure 4B:
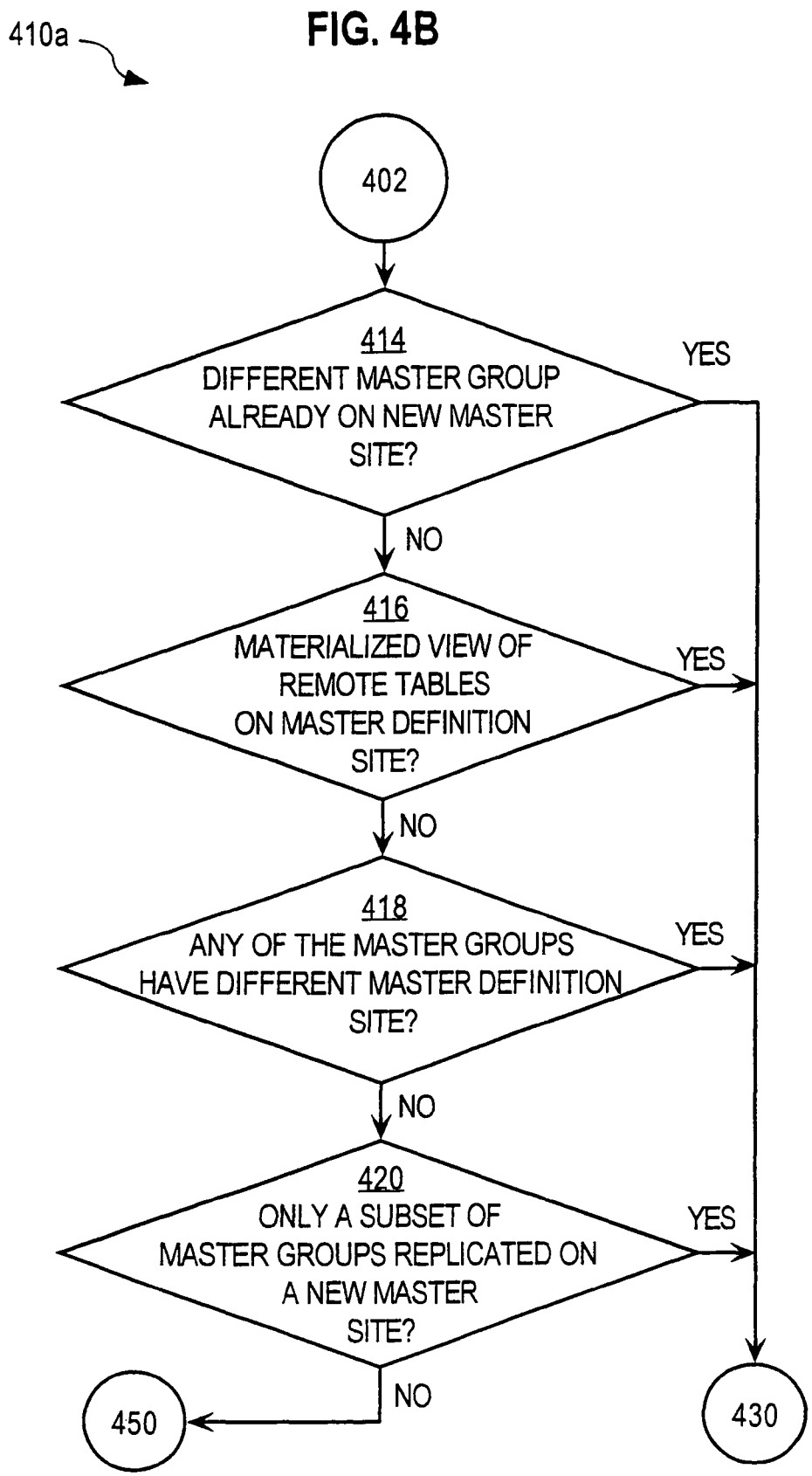
FIG. 4B is a flowchart that illustrates detailed steps of an embodiment of one step of the method depicted in FIG. 4A.

FIG. 4B is a flowchart that illustrates detailed steps for determining whether conditions allow a full database copy, according to an embodiment 410*a* of step 410 of the method 230*a* depicted in FIG. 4A.

In step 414, it is determined whether the new master site already stores a copy of a master group that is different from the master group to be replicated. For example, it is determined whether the new master site 162 stores a master group different than master group 110. The determination may be performed using any method.

In one embodiment, the database server 104*d* on the new master site makes the determination automatically and communicates the determination to the database server 104*b* on the master definition site for the master group being replicated. In another embodiment, a database administrator makes the determination based on information obtained from the database server 104*d*. If the new master site already stores a copy of a different master group, then conditions for a full database copy are not satisfied, and control passes to step 430 illustrated in FIG. 4A to copy individual database objects.

In step 416, it is determined whether the master definition site stores a materialized view containing data from a remote database object. For example, it is determined whether the master group 110*b* on the master definition site 122 includes such a materialized view. In general, a materialized view is derived from data that appear in one or more other database objects. A materialized view may contain data from remote database objects that are not in a full database being replicated from the master definition site. Such a materialized view is preferably created from the beginning in order to permit incremental refresh of the materialized view as the underlying database objects change. Such a materialized view is preferably not copied from the master definition site, as occurs with the available routines that perform a full database copy. The determination may be performed using any manual or automatic technique. If the master definition site includes such a materialized view, then conditions for a full database copy are not satisfied, and control passes to step 430 illustrated in FIG. 4A to copy individual database objects.

In step 418, it is determined whether any two or more of the master groups being replicated on the new master site have different master definition sites. For example, it is determined whether a second master group is to be replicated to new master site 162 and has a master definition site at node 102 or 142. The second master group is different from master group 110. The determination may be performed using any manual or automatic technique. If the master groups being replicated on the new master site have different master definition sites, then conditions for a full database copy are not satisfied, and control passes to step 430 illustrated in FIG. 4A to copy individual database objects.

In step 420, it is determined whether the set of groups being replicated on the new master site is a subset of the master groups on the master definition site. For example, it is determined whether the set of groups to be replicated to new master site 162 excludes the master group 110*b* on the master definition site 122. The determination may be performed using any manual or automatic technique. If the set of groups being replicated is a subset of the master groups, then conditions for a full database copy are not satisfied, and control passes to step 430 illustrated in FIG. 4A to copy individual database objects.

In some embodiments, other properties are tested to determine whether conditions are satisfied for using routines that perform full database copying. In some embodiments, one or more of the steps depicted in FIG. 4B are omitted.

When all of the properties tested indicate conditions are satisfied, e.g., none indicate conditions are not satisfied, control passes to step 450 illustrated in FIG. 4A to employ a full-database-copy routine to copy the full database.

Copying Individual Objects

Figure 4C:
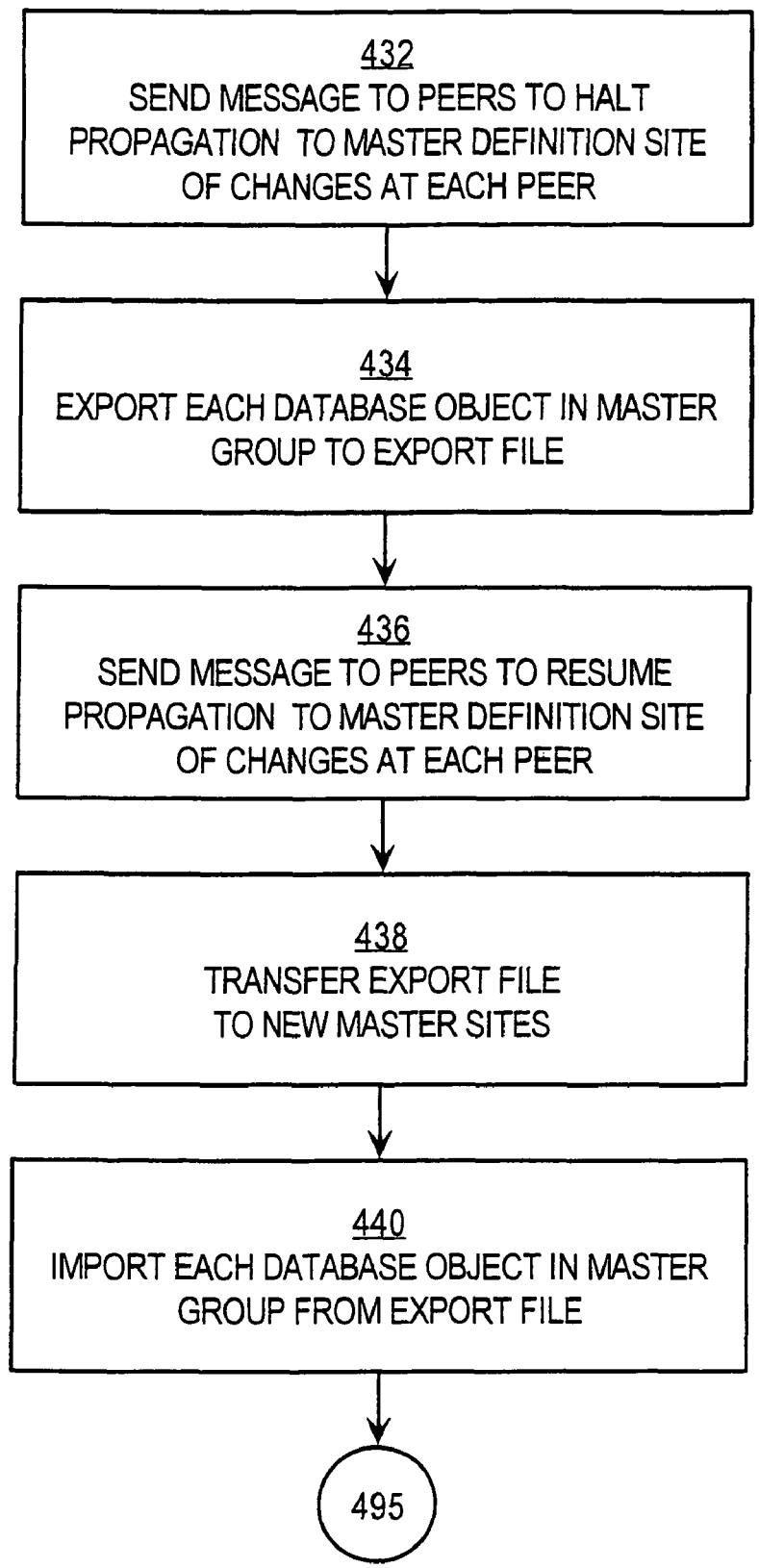
FIG. 4C is a flowchart that illustrates detailed steps of an embodiment of one step of the method depicted in FIG. 4A.

FIG. 4C is a flowchart that illustrates detailed steps for copying individual database objects according to an embodiment 430a of step 430 of the method 230a depicted in FIG. 4A.

In step 432, a message is sent to peers, excluding the master definition site, to halt propagation of changes to the master definition site. For example, a message is sent to master sites 102, 142 to stop propagating, to the master definition site 122, changes to the master group 110 made at those sites 102, 142. This message can be sent in any manner in the art. In some embodiments in which it has already been determined to use available database-object-copying routines for individual database objects when the first message is sent in step 402, the message is included with the first message indicating replication of the master group to the new master site. The message of step 432 is sent because the available database-object-copying routines assume no database servers propagate changes to the master definition site during the copying process. In some embodiments, the message of step 432 includes data indicating a time to halt propagation to the master definition site. In some embodiments, the time to halt propagation to the master definition site is the same as the particular time to start storing changes for the new master site.

In response to receiving the message of step 432, as described in more detail below with reference to FIG. 5A and FIG. 5B, the database servers on the receiving master sites, excluding the master definition site, configure a data structure for storing data indicating changes for the master group. In addition, propagation from those master sites to the master definition site is disabled, i.e., is not performed according to the conventional schedule. For example, the database servers 104a, 104c on the master sites 102, 142, respectively, form the data structure 134 for the master definition site that includes a disable propagation flag. In another embodiment the data structure 134 is already formed for deferred propagation to the new master sites and each record includes the destination site field 152. In this embodiment data is inserted into the replication catalog that indicates that the master definition site is to use deferred transmission. In another embodiment, the data structure 134 is already formed for propagation according to the conventional schedule and already includes fields 152 and 154. In this embodiment, the replication catalog is changed to indicate the master definition site is to use deferred transmission.

In step 434, the database server on the master definition site, for each master group being replicated, exports each database object in that master group using an available database-object-copying routine to export a database object by producing one or more export files. The export can be done with respect to a consistent point in time. For example, the database server 104b on the master definition site 122 exports each database object in the master group 110b at the particular time using the available database-object-copying routine.

In step 436, a message is sent to peers, excluding the master definition site, to resume propagation of changes to the master definition site. For example, a message is sent from the database server 104b on the master definition site 122 to the database servers 104a, 104c on master sites 102, 142 to resume propagation to the master definition site 122 of data indicating changes. In some embodiments, the message is sent after export files for all database objects in the master group have been generated. Unlike halting propagation to the master definition site using change-based recovery routines, mentioned above, the time period for which propagation is halted using database object export routines may be extensive and perceptible to a user of the database system.

In response to receiving the message of step 436, as described in more detail below with reference to FIG. 5E, the database servers on the receiving master sites, excluding the master definition site, configure a change queue data structure so that propagation to the master definition site is enabled, e.g., is again performed according to the conventional schedule. For example, the database servers 104a, 104c on the master sites 102, 142, respectively, configure the data structure 134 to enable propagation by setting the disable propagation flag 154 to OFF for change records with a destination site field 152 holding data indicating the master definition site 122.

In step 438, the export files generated during step 434 are sent to the new master sites. For example, export files for the database objects of the master group 110 are transmitted over the network 170 to the new master site 162. Any method in the art for transferring files over a network may be used.

In step 440, the database servers on the new master sites import all the database objects from the export files transferred in step 438. For example, the database server 104d on the new master site 162 imports all the database objects of the master group 110 from the export files transferred in step 438. Step 440 is further described below with reference to FIG. 6.

After step 440, the master groups exist on the new master sites, and the database servers on the new master sites can receive changes for the master groups and update the master groups based on the changes received. Control passes to step 495, described above with reference to FIG. 4A to notify the master sites that the database servers on the new master sites can receive data indicating the changes.

Full Database Import/Export

Figure 4D:
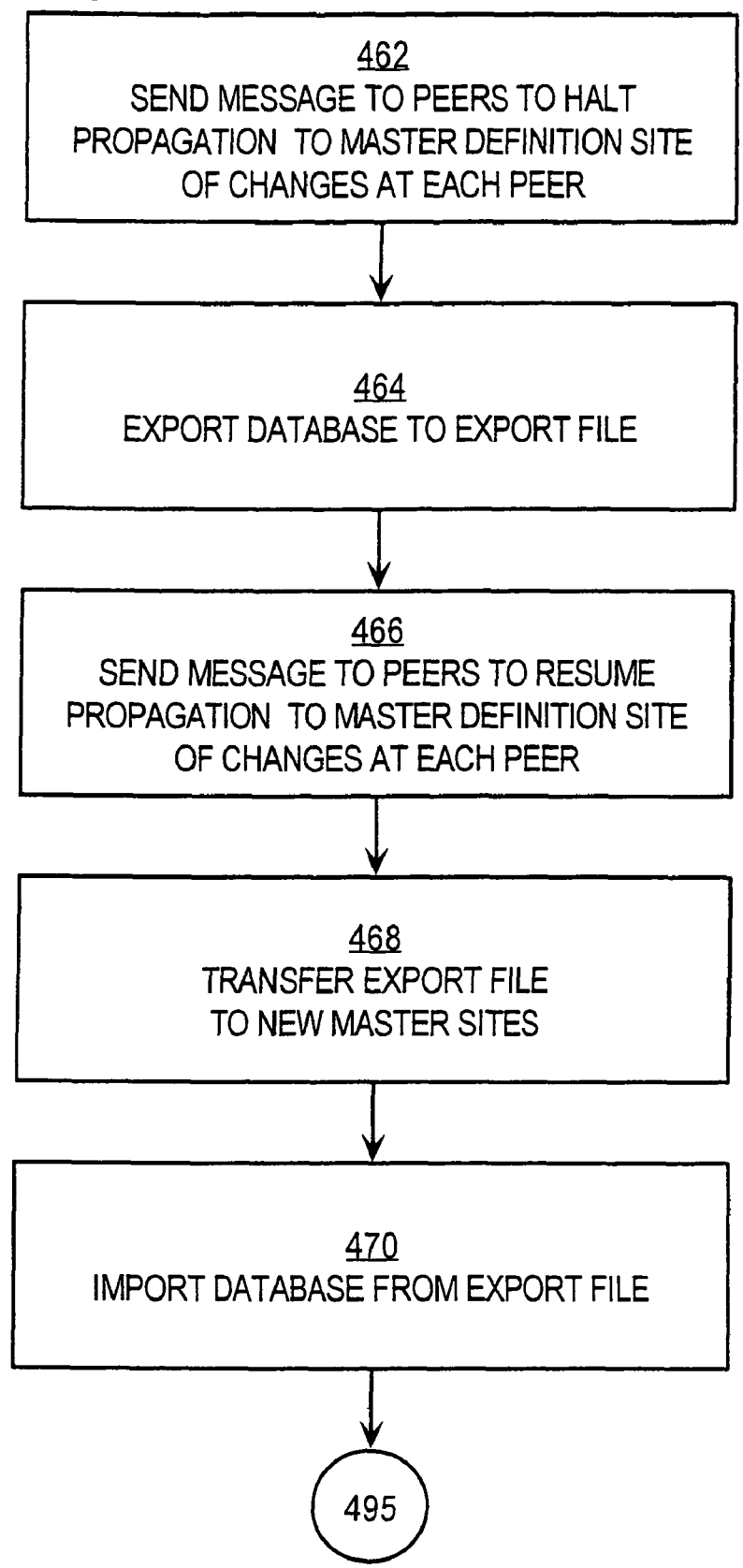
FIG. 4D is a flowchart that illustrates detailed steps of an embodiment of one step of the method depicted in FIG. 4A.

FIG. 4D is a flowchart that illustrates detailed steps for copying a full database using export and import routines according to an embodiment 460a of step 460 of the method 230a depicted in FIG. 4A. The flowchart of FIG. 4D parallels that of FIG. 4C, except that the routines employed in the flowchart of FIG. 4D export and import an entire database, while the routines in the flowchart of FIG. 4C export and import individual database objects.

In step 462, a message is sent to peers, excluding the master definition site, to halt propagation of changes to the master definition site. The message of step 462 is sent because routines to export and import a full database assume no database servers propagate changes to the master definition site during the exporting process. In some embodiments, the message of step 462 includes data indicating a time to halt propagation to the master definition site. In some embodiments, the time to halt propagation to the master definition site is the same as the particular time to start storing changes for the new master site.

In response to receiving the message of step 462, as described in more detail below with reference to FIG. 5A and FIG. 5B, the database servers on the receiving master sites, excluding the master definition site, disable propagation to the master definition site, e.g., propagation is not performed according to the conventional schedule.

In step 464, the database server on the master definition site exports the entire database on the master definition site using a routine to export a database by producing one or more export files. For example, the database server 104b on the master definition site 122 exports the full database on master definition site 122 at the particular time.

In step 466, a message is sent to peers, excluding the master definition site, to resume propagation of changes to the master definition site. For example, a call is made to a new database server routine called "resume_propagation_to_mdef" which causes the message to be sent. In some embodiments, the message is sent after export files for the full database have been generated. Unlike halting propagation to the master definition site using change-based recovery routines, mentioned above, the time period for which propagation is halted using full database export routines may be extensive and perceptible to a user of the database system.

In response to receiving the message of step 466, as described in more detail below with reference to FIG. 5E, the database servers on the receiving master sites, excluding the master definition site, enable propagation to the master definition site, e.g., propagation is again performed according to the conventional schedule.

In step 468, the export files generated during step 464 are sent to the new master sites. For example, export files for the full database on master definition site 122 are transmitted over the network 170 to the new master site 162. Any method in the art for transferring files over a network may be used.

In step 470, the database servers on the new master sites import the database from the export files transferred in step 438. For example, the database server 104*d* on the new master site 162 imports the full database of master definition site 122, including the master group 110*b*, from the export files transferred in step 438. Step 470 is further described below with reference to FIG. 6.

After step 470, the master groups exist on the new master sites, and the database servers on the new master sites can receive changes for the master groups and update the master groups based on the changes received. Control passes to step 495, described above with reference to FIG. 4A to notify the master sites that the database servers on the new master sites can receive data indicating the changes.

Processing Database Requests While Transferring

FIG. 5A is a flowchart that illustrates detailed steps for processing database requests involving the master groups according to an embodiment 260*a* of step 260 of the method 200 depicted in FIG. 2.

In step 502, messages are received at a database server from the master definition sites indicating the master groups that are going to be replicated to the new master sites. For example, a message is received at master site 102 from master definition site 122 indicating that master group 110 is going to be replicated to the new master site 162. In some embodiments, the message indicates the particular later time when the contents of the master group at the master definition site are going to be transferred. The messages received in step 502 signify that the master sites are to store changes made to local replicas of the master groups for deferred transmission to the new master sites. The messages received in step 502 also signify that the changes to the local replicas are to be stored for deferred transmission to the master definition site. Step 502 is described in more detail below with reference to FIG. 5B.

In step 520 a request is received at a database server from a user of the distributed database, such as a user of application 108. The request may comprise a query to retrieve certain data from a database object in a master group, or a database operation to change the data in a master group, such as by adding data, deleting data, or updating data (e.g., replacing data in a row of a database table). In some embodiments the request may comprise a database operation to change the definition of the database objects in a master group, such as by adding a column to a table, or revising a trigger. In the illustrated embodiment, the term "change to the master group" includes a change to data in the database objects of the master group, but not a change in the definition of a database object or a change in the list of the database objects that belong to a master group.

In step 530 the database request is processed by a database server at an existing master site having a replica of the master group. Thus, the request is not processed by the new master site, and requests can be processed even while the new master site is being generated and before the new master site is able to process requests. For example, a request from a user of a client process 184 in communication with master node 142 is processed by the local database server 104*c* using the local copy 110*c* of the master group 110. In another embodiment, a request received by database server 104*c* on master site 142 may be processed by database server 104*a* using copy 110*a* of master group 110. Changes to the copy of the master group, on the existing master site where the request is processed, are stored for propagation to other master sites as in the conventional system. Step 530 is described in more detail below with reference to FIG. 5C.

In step 550, changes to a copy of the master group are stored by the database server on the same master site as the copy of the master group for deferred transmission. For example, the changes to copy 110*c* of master group 110 at master site 142 are stored by database server 104*c* on master site 142 in the change data structure 134. Step 550 is described in more detail below with reference to FIG. 5D.

In step 570, a message is received from the master definition site indicating that changes stored for deferred transmission may be propagated to either the master definition site, or the new master site, or both. For example, a message is received at the database server 104*a* on master site 102 from the database server 104*b* on the master definition site 122 indicating that changes stored for deferred transmission may be propagated to the new master site 162. In another embodiment, the message is received from the new master site that changes may be propagated to the new master site.

In step 580, in response to receiving the message of step 570, the database server propagates the stored data indicating changes in the local master group to the master definition site, or the new site, or both. For example, the database server 104*a* propagates the data stored in association with change record 136 having a destination site field 152 containing an address for the new master site 162 to the new master site 162.

Steps 570 and 580 are described in more detail below with reference to FIG. 5E.

FIG. 5B is a flowchart that illustrates detailed steps for receiving messages indicating deferred transmissions according to an embodiment 502*a* of step 502 of the method 260*a* depicted in FIG. 5A.

In step 504, the database server receives a first message from the master definition sites that master groups that are being replicated to the new master sites. For example, database server 104*a* receives a message from database server 104*b* on master definition site 122. The message indicates that master group 110 is being replicated to the new master site 162.

In step 506 changes for deferred transmission to the new master sites are stored in a change queue data structure. For example, the change queue data structure 134 is generated to store a change record 136 with a disable propagation flag 154 set to a value of "ON" and a destination site field 152 set to a value indicating an address of new master site 162.

In step 508, the database server receives another message from the master definition sites that propagation of changes to the master definition site should be halted. For example, database server 104*a* receives a message from database server 104*b* on master definition site 122 to halt propagation of changes to master definition site 122.

In step 510, changes for deferred transmission to the master definition site, as indicated in the message of step 508, are stored in a change queue data structure. For example, a change record 136 having a disable propagation flag 154 set to a value of "ON" and having a destination site field 152 set to a value indicating an address of the master definition site 122, is added to change queue data structure 134.

Figure 5C:
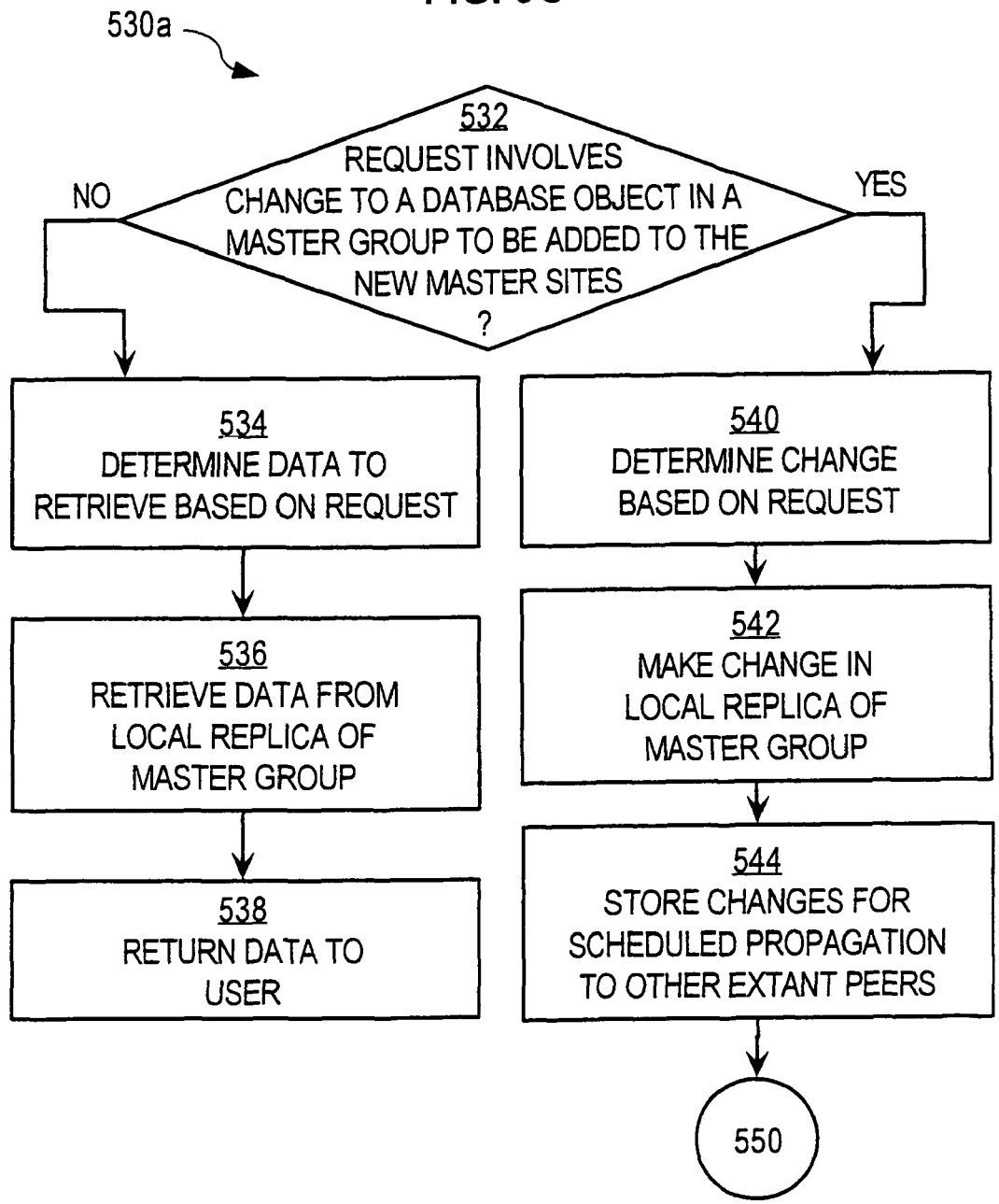
FIG. 5C is a flowchart that illustrates detailed steps of an embodiment of one step of the method depicted in FIG. 5A.

FIG. 5C is a flowchart that illustrates detailed steps for processing a database request according to embodiment 530*a* of step 530 of the method 260*a* depicted in FIG. 5A.

In step 532 it is determined whether the request involves a change to a database object in a master group being replicated to the new master sites. If not, control passes to step 534 and following steps. Otherwise, control passes to step 540.

In step 534, the database server determines the data to retrieve from the master group based on the request. In step 536 the database server retrieves the data from the local replica of the master group. In step 538, the retrieved data is returned to the application for the user of the client process that initiated the request. No changes are made to the data in the local replica of the master group and so no changes are stored.

In step 540, one or more changes to one or more database objects in the local replica of the master group is determined based on the request. In step 542, each change is made to a database object of the local replica of the master group.

In step 544, data indicating each change is stored for propagation to the other master nodes for the master group. For example, data indicating a change is stored by the database server 104*a* in a change queue data structure for propagation to all master nodes in the replication catalog according to the conventional schedule, depending on user selections, network bandwidth, and network traffic. Control then passes to step 550 to store data for deferred transmission, if any.

FIG. 5D is a flowchart that illustrates detailed steps for storing data indicating changes to a master group for deferred transmission according to embodiment 550*a* of step 550 of the method 260*a* depicted in FIG. 5A.

In step 552, it is determined whether the change queue data structure 134 resides on the local site for deferred transmission to new master sites. For example, it is determined whether the change data structure 134 that stores a change record 136 with a disable propagation flag 154 and a destination site field 152, as a result of step 506 of FIG. 5B, described above. In another embodiment that uses a separate data structure for each site, the record does not include destination field 152. Control then passes to step 558.

If it is determined in step 552 that the data structure 134 does not reside on the local site, control passes to step 554 to form the data structure 134.

In step 558, the change is not propagated to the new master site according to the conventional schedule, but is saved in association with the record 136 in the change queue data structure 134. For example, in one embodiment, the change is stored in a separate data structure and refers to record 136 in data structure 134. In this embodiment, the change is not removed from the separate data structure of the database server 104*a* after being propagated to the database servers 104*b*, 104*c* on master sites 132, 142, respectively. In another embodiment the change is stored in record 136. The change is stored in association with the record 136 indicating the new master site 162 until another message is received that allows the change to be propagated to the new master 162. In some embodiments, the change is copied from a change queue data structure to a separate queue data structure generated especially for the new master sites.

In step 560, it is determined whether the change queue data structure 134 resides on the local site for deferred transmission to the master definition site. For example, it is determined whether the change data structure 134 that stores a change record 136 with a disable propagation flag 154 and a destination site field 152, as a result of step 510 of FIG. 5B, described above. In another embodiment that uses a separate data structure for each site, the record does not include destination field 152. Control then passes to step 562.

If it is determined in step 560 that the data structure 134 does not reside on the local site, control passes to step 570.

In step 562, the change is not propagated to the master definition site according to the conventional schedule, but is saved in association with the record 136 in the change queue data structure 134. For example, in one embodiment, the change is stored in a separate data structure and refers to record 136 in data structure 134. In this embodiment, the change is not removed from the separate data structure of the database server 104*a* after being propagated to the database servers 104*b*, 104*c* on master sites 122, 142, respectively. In another embodiment the change is stored in record 136. The change is stored in association with the record 136 indicating the master definition site 122 until another message is received that allows the change to be propagated to the master definition site 122. In some embodiments, the change is copied from a change queue data structure to a separate queue data structure generated especially for the master definition site.

Figure 5E:
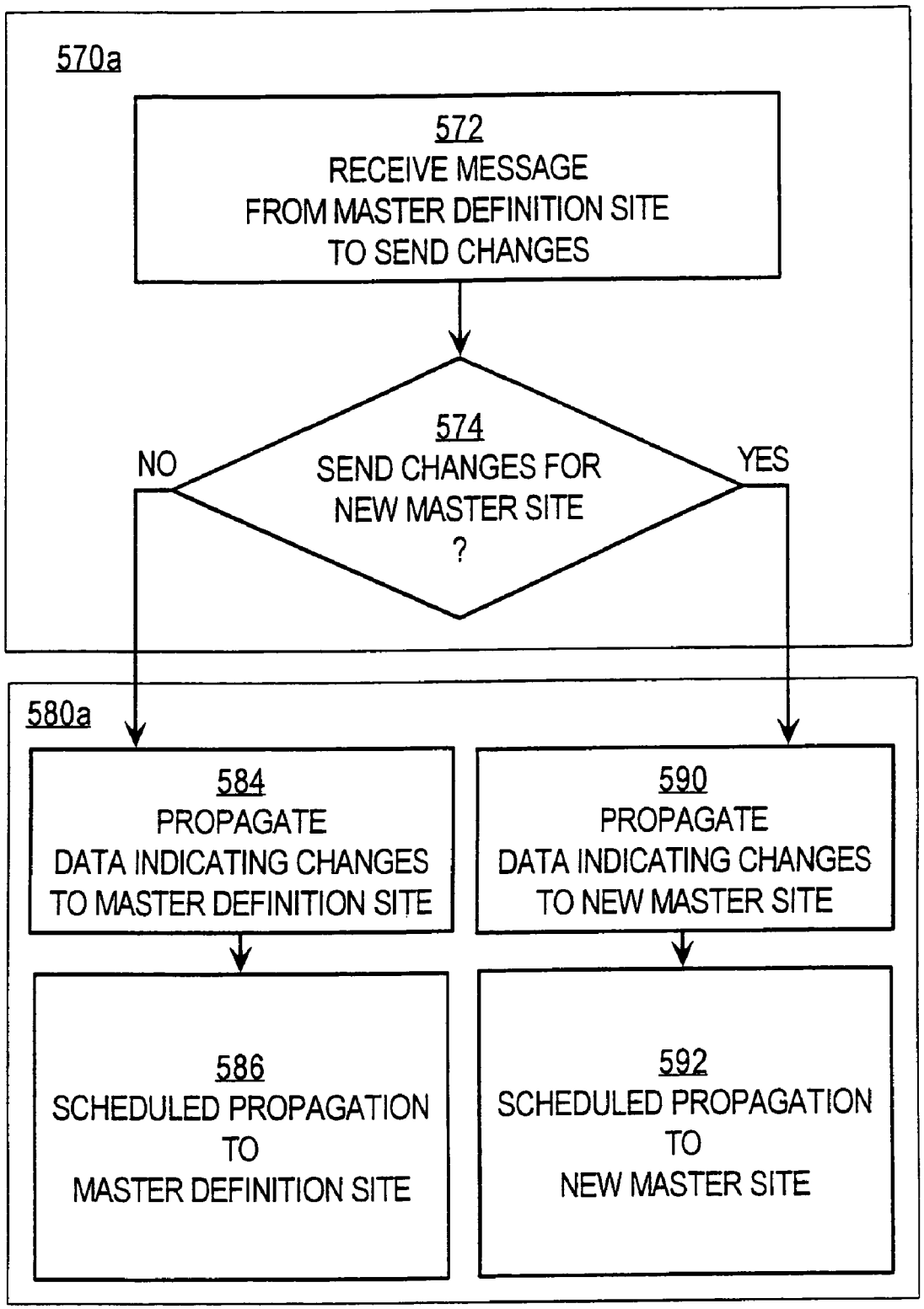
FIG. 5E is a flowchart that illustrates detailed steps of an embodiment of one step of the method depicted in FIG. 5A.

FIG. 5E is a flowchart that illustrates detailed steps for receiving messages and propagating changes in response thereto, according to embodiments 570*a* and 580*a* of steps 570 and 580, respectively, of the method 260*a* depicted in FIG. 5A.

In step 572, a message is received from the master definition site to propagate changes stored for deferred transmission. In another embodiment, the messages are received from the new master sites. For example, the message is received by database server 104*a* as a result of the message sent in step 495 by database server 104*b*. The message indicates that changes may be sent to the new master site 162. For another example, the message is received by database server 104*a* as a result of the message sent in step 436 by database server 104*b* after exporting all database objects in the master group. The message indicates that it is time to resume propagating changes to the master definition site 122.

In step 574, it is determined whether the message indicates the changes should be sent for the new master sites or the master definition site.

If it is determined in step 574 that the message indicates the changes should be sent to a master definition site, control passes to step 584. In step 584, the changes stored for deferred transmission to the master definition site are propagated to that site. In some embodiments, in which all changes are disabled, the changes are propagated in an order in which they are stored in a change queue. In some embodiments, in which only changes to replication groups with new master sites were disabled, changes for other replication groups are delayed until changes for the replication groups with new master sites catch up.

In step 586, the conventional scheduled propagation is enabled for changes to the master definition site. For example, in the change data structure 134, the change record 136 that has a value in the destination site field indicating the address of the master definition site 122 has the value in the disable propagation flag reset to "OFF;" or, in other embodiments, the record is deleted from the change data structure 134.

If it is determined in step 574 that the message indicates the changes should be sent to a new master site, control passes to step 590. In step 590, the changes stored for deferred transmission to the new master site are propagated to that site. In some embodiments, in which all changes are disabled, the changes are propagated in order stored in a change queue. In some embodiments, in which only changes to replication groups with new master sites were disabled, changes for other replication groups are delayed until changes for the new master sites catch up. In step 592, the conventional scheduled propagation is enabled for changes to replication groups with the new master site. For example, in the change data structure 134, the change record 136 that has a value in the destination site field indicating the address of the new master site 162 has the value in the disable propagation flag reset to "OFF;" or, in other embodiments, the record is deleted from the change data structure 134.

Using embodiments described above, extant master sites continue to process database requests and store changes for scheduled propagation to extant master sites and for deferred transmission to new master sites, and for deferred transmission to master definition sites. The changes stored for deferred transmission are propagated to the master definition sites when the export routines complete at those sites, and propagated to the new master sites after those sites instantiate the database objects of the master groups.

Processing Changes at the New Master Nodes

Figure 6:
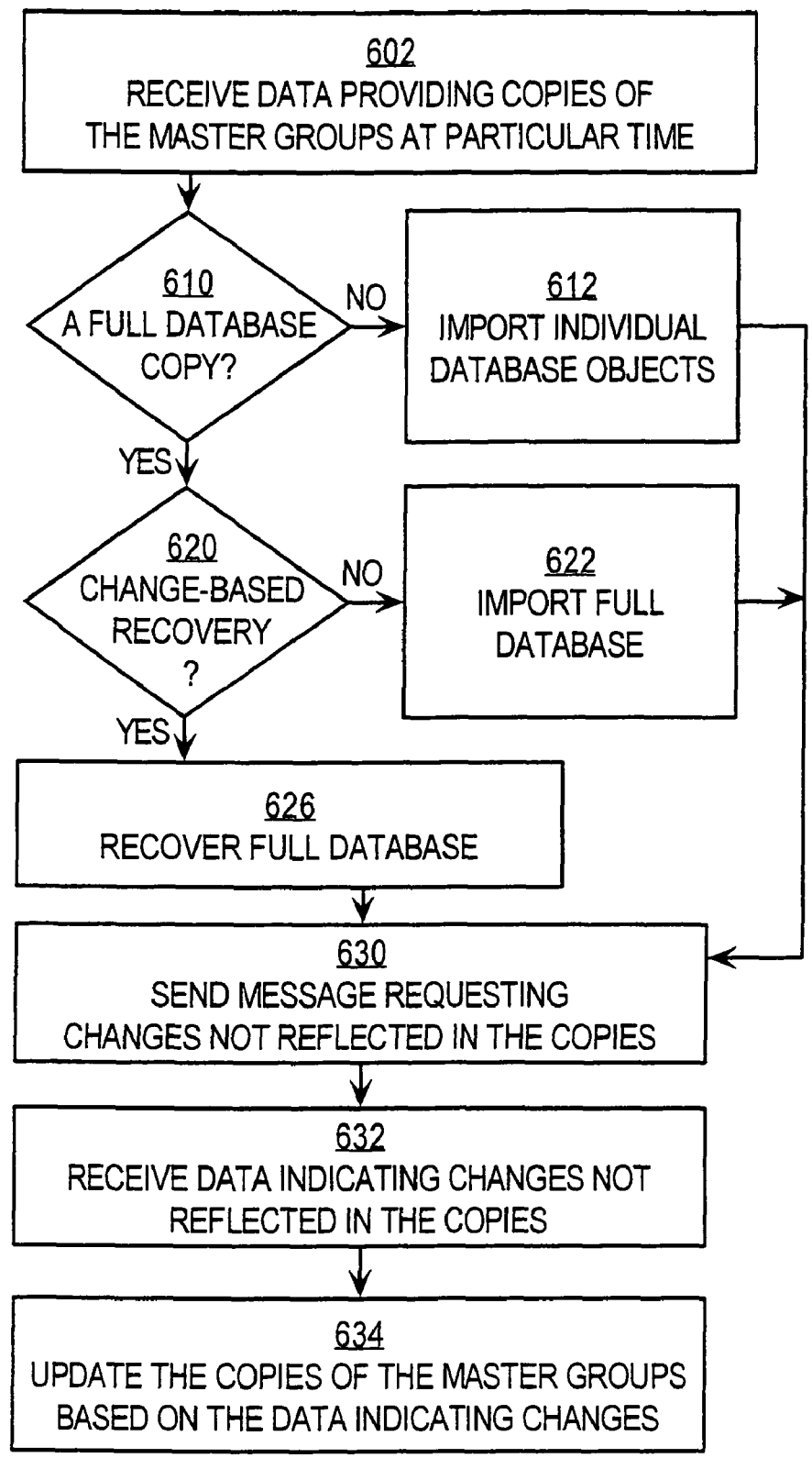
FIG. 6 is a flowchart that illustrates a method for replicating groups of database objects onto a new master site according to another embodiment.

FIG. 6 is a flowchart that illustrates a method for replicating groups of database objects at the new master site according to an embodiment.

In step 602, the database server at a new master site receives data providing copies of the master groups as those groups existed on their master definition sites at a particular time. For example, the database server 104*d* at new master site 162 receives data providing copies of the master group 110*b* as that group existed on the master definition site 122 at a particular time.

Step 610 represents a decision point based on whether a full database copy is received. If a full database copy is not provided, control passes to step 612 to import individual database objects of the master groups being replicated to the new master using database-object-copying import routines for individual database objects. Step 612 corresponds, for a single new master site, to step 440 of FIG. 4C.

Step 620 represents a decision point based on whether a full database copy is formed from change-based recovery routines. If not, then control passes to step 622 to import a full database including the master group to the new master using the conventional import routine for a full database. To ensure that the new database on new master site has a unique global name, a call is made to a new database server routine "prepare_instantiated_master." The routine ensures the database is instantiated with a unique global name, renaming the database if necessary. The routine also modifies the replication catalog to reflect the global name of the database, drains the queue storing changes to be propagated to other master nodes on the conventional schedule, and disables propagation of changes for all master sites. Step 622 corresponds, for a single new master site, to step 470 of FIG. 4D.

If a full database copy is formed from change-based recovery routines, then control passes to step 626 to reconstitute the database for the particular time from archives using the conventional recovery system. To ensure that the new database on the new master site has a unique global name, a call is made to the new database server routine "prepare_instantiated_master." Step 626 corresponds, for a single new master site, to step 480 of FIG. 4A.

As a result of step 612, 622 or 626, the master group is instantiated on the new master site and filled with the data that existed on the master definition site at the particular time. A copy of the replication catalog is also instantiated and populated.

In step 630, the new master site sends a message to the other master sites in its replication catalog, requesting changes not reflected in the copies of the master groups received in step 602. In some embodiments, step 630 is omitted, and a message is sent instead by the database server on the master definition site.

In step 632, the new master site begins receiving data indicating changes to the master groups made at the other master sites since the particular time. The data received from each master site indicates the changes made by the database server at that site to the replica of the master group at that site.

In step 634, the database server 104*d* on the new master site 162 updates the master group based on the data indicating changes in the manner of a conventional master site.

Hardware Overview

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for making a replica of a particular group of database objects on a particular node of a network, the method comprising:
   sending a first message which indicates that the particular group of database objects is to be replicated to the particular node;
   after sending the first message and at any point of time after the first message is received, making a determination of whether conditions for copying a full database from a first node are satisfied, wherein the first node is a first master definition node authorized to define members of the particular group of database objects;
   wherein the particular group of database objects includes one or more database tables, one or more indices on the one or more database tables, and one or more database views;
   wherein the particular group of database objects is configured for replication in a distributed database system that comprises the first node and the particular node;
   wherein the particular node does not initially have the particular group of database objects;
   wherein multiple nodes in the distributed database system contain the same particular group of database objects;
   wherein the particular group of database objects are replicated together as a replication group, and wherein changes made to a local replica of the replication group at any one node of the distributed database system are propagated to other nodes of the distributed database system to which the replication group is replicated;
   wherein the first node comprises a first instance of a database server that manages the database and the particular node comprises a particular instance of the database server;
   wherein the first instance and the particular instance of the database server are both configured to receive queries from one or more client devices that are different than the first node and the particular node, and to process the queries by performing:
   retrieving data from one or more database objects; and
   modifying the data in the one or more database objects;
   if the determination is that the conditions for copying the full database from the first node are not satisfied, then employing a database-object-copy routine for each database object in the particular group of database objects even when the particular node does not have the particular group of database objects, wherein the conditions for copying the full database from the first node are not satisfied if one or more of the following is satisfied:

the first node stores a set of one or more groups of database objects, the set including the particular group of database objects, and the set including a group of database objects that includes a view embodied as a separate database table with rows and columns derived from one or more remote database tables; and the first node stores one or more additional groups of database objects, each additional group stored on each of a corresponding set of one or more nodes on the network, and a second node, different from the first node, is a second master definition node for a group of the one or more additional groups; and if the determination is that the conditions for copying the full database from the first node are satisfied, then employing a full-database-copy routine for performing a copy of the entire database from the first node;

wherein the method is performed by one or more computer systems.

2. The method of claim 1, wherein:

the conditions for copying the full database from the first node are further not satisfied if a group of the one or more additional groups is not to be copied onto the particular node.

3. The method of claim 1, wherein the conditions for copying the full database from the first node are further not satisfied if the particular node already stores a group of database objects from a database that also includes the particular group of database objects.

4. The method of claim 1, wherein said step of employing a full-database-copy routine comprises employing a database function for exporting a full database.

5. The method of claim 1, wherein said step of employing a full-database-copy routine comprises employing a database function for recovery of database changes.

6. A computer-readable storage medium storing one or more sequences of instructions for making a replica of a particular group of database objects on a particular node of a network, wherein execution of the one or more sequences of instructions by one or more processors causes the one or more processors to perform the steps of:

sending a first message which indicates that the particular group of database objects is to be replicated to the particular node;

after sending the first message and at any point of time after the first message is received, making a determination of whether conditions for copying a full database from a first node are satisfied, wherein the first node is a first master definition node authorized to define members of the particular group of database objects;

wherein the particular group of database objects includes one or more database tables, one or more indices on the one or more database tables, and one or more database views;

wherein the particular group of database objects is configured for replication in a distributed database system that comprises the first node and the particular node;

wherein the particular node does not initially have the particular group of database objects;

wherein multiple nodes in the distributed database system contain the same particular group of database objects;

wherein the particular group of database objects are replicated together as a replication group, and wherein changes made to a local replica of the replication group at any one node of the distributed database system are propagated to other nodes of the distributed database system to which the replication group is replicated;

wherein the first node comprises a first instance of a database server that manages the database and the particular node comprises a particular instance of the database server;

wherein the first instance and the particular instance of the database server are both configured to receive queries from one or more client devices that are different than the first node and the particular node, and to process the queries by performing:

retrieving data from one or more database objects; and modifying the data in the one or more database objects;

if the determination is that the conditions for copying the full database from the first node are not satisfied, then employing a database-object-copy routine for each database object in the particular group of database objects even when the particular node does not have the particular group of database objects, wherein the conditions for copying the full database from the first node are not satisfied if one or more of the following is satisfied:

the first node stores a set of one or more groups of database objects, the set including the particular group of database objects, and the set including a group of database objects that includes a view embodied as a separate database table with rows and columns derived from one or more remote database tables; and the first node stores one or more additional groups of database objects, each additional group stored on each of a corresponding set of one or more nodes on the network, and a second node, different from the first node, is a second master definition node for a group of the one or more additional groups; and if the determination is that the conditions for copying the full database from the first node are satisfied, then employing a full-database-copy routine for performing a copy of the entire database from the first node.

7. The computer-readable storage medium of claim 6, wherein:

the conditions for copying the full database from the first node are further not satisfied if a group of the one or more additional groups is not to be copied onto the particular node.

8. The computer-readable storage medium of claim 6, wherein the conditions for copying the full database from the first node are further not satisfied if the particular node already stores a group of database objects from a database that also includes the particular group of database objects.

9. The computer-readable storage medium of claim 6, wherein the instructions that cause the one or more processors to perform employing a full-database-copy routine comprise instructions which, when executed by the one or more processors, cause the one or more processors to perform employing a database function for exporting a full database.

10. The computer-readable storage medium of claim 6, wherein the instructions that cause the one or more processors to perform employing a full-database-copy routine comprise instructions which, when executed by the one or more processors, cause the one or more processors to perform employing a database function for recovery of database changes.

* * * * *